United States Patent
Ohashi et al.

(10) Patent No.: US 9,873,484 B2
(45) Date of Patent: Jan. 23, 2018

(54) SADDLE-TYPE VEHICLE

(71) Applicant: KABUSHIKI KAISHA F.C.C., Hamamatsu-shi, Shizuoka (JP)

(72) Inventors: Tatsuyuki Ohashi, Hamamatsu (JP); Kazuyoshi Miyachi, Hamamatsu (JP); Shouji Makita, Hamamatsu (JP); Ryouhei Chiba, Hamamatsu (JP); Kaoru Iida, Hamamatsu (JP); Makoto Sato, Hamamatsu (JP)

(73) Assignee: KABUSHIKI KAISHA F.C.C., Hamamatsu-Shi (JP)

( * ) Notice: Subject to any disclaimer, the term of this patent is extended or adjusted under 35 U.S.C. 154(b) by 102 days.

(21) Appl. No.: 15/005,775

(22) Filed: Jan. 25, 2016

(65) Prior Publication Data
US 2016/0137261 A1   May 19, 2016

Related U.S. Application Data

(63) Continuation of application No. PCT/JP2014/069488, filed on Jul. 23, 2014.

(30) Foreign Application Priority Data

Jul. 25, 2013  (JP) .................................. 2013-154797

(51) Int. Cl.
*B60W 10/02* (2006.01)
*B62M 25/04* (2006.01)
(Continued)

(52) U.S. Cl.
CPC ............ *B62M 25/04* (2013.01); *B60W 10/02* (2013.01); *B62K 11/14* (2013.01); *B62K 23/02* (2013.01);
(Continued)

(58) Field of Classification Search
CPC ..... B60W 10/06; B60W 10/02; Y10T 477/87; Y10T 477/78; F02N 11/0822;
(Continued)

(56) References Cited

U.S. PATENT DOCUMENTS 9,410,491 B2 *  8/2016  Chang .................. F02D 11/106
2017/0080938 A1 *  3/2017  Ohashi ................. B60W 30/16

FOREIGN PATENT DOCUMENTS

JP    2005-226514    8/2005
JP    4859042    3/2008
(Continued)

*Primary Examiner* — Roger L Pang
(74) *Attorney, Agent, or Firm* — Knobbe, Martens, Olson & Bear, LLP

(57) ABSTRACT

A saddle-type vehicle can be configured to perform idle-stop during deceleration corresponding to a driver's demand. In some embodiments, the vehicle comprises a bar handle mounted on its opposite tip ends with a grasping grip grasped by the driver and a throttle grip for accelerator operation; two operation controls for performing braking operation, at least one of which being a first brake and a second brake mounted on tip ends of the bar handle; and an engine controller for automatically stopping an engine and making the engine an idle-stop state. In some cases, the saddle-type vehicle further comprises a judgment controller for judging whether a simultaneous operation of the first and second brakes has been achieved; and the engine controller performs the idle-stop during deceleration of the vehicle when the judgment controller judges that the simultaneous operation of the first and second brakes has been performed.

20 Claims, 16 Drawing Sheets

| Engine start method | Engine start condition | Clutch control | Dog clutch control |
|---|---|---|---|
| Accelerator operation | ON | Steady travel control (Start control in case of start) | ON |
| First brake Second brake | OFF | Creep control or Idle-neutral control | ON |
| Vehicle speed | Increase | Idle-neutral control | ON |
| Battery | Reduction of remaining battery | | |
| Idle-stop time | Progress of predetermined time | | |
| Transmission range operation | D → N | OFF | ON ⇒ OFF |
| | L → N | OFF | ON ⇒ OFF |

(51) Int. Cl.
*B62K 23/06* (2006.01)
*F02D 17/00* (2006.01)
*F02D 29/02* (2006.01)
*F02D 11/02* (2006.01)
*F02N 11/08* (2006.01)
*B62K 11/14* (2006.01)
*B62K 23/02* (2006.01)
*B60W 10/06* (2006.01)
*F02B 61/02* (2006.01)
*B62M 25/00* (2006.01)

(52) U.S. Cl.
CPC .............. *B62K 23/06* (2013.01); *F02D 11/02* (2013.01); *F02D 17/00* (2013.01); *F02D 29/02* (2013.01); *F02N 11/0822* (2013.01); *B60W 10/06* (2013.01); *B62M 2025/006* (2013.01); *F02B 61/02* (2013.01); *F02N 2200/102* (2013.01); *Y02T 10/48* (2013.01); *Y10T 477/78* (2015.01); *Y10T 477/87* (2015.01)

(58) Field of Classification Search
CPC .... F02N 2200/102; F02D 11/02; F02D 17/00; Y02T 10/48

USPC .......................................................... 701/67
See application file for complete search history.

(56) References Cited

FOREIGN PATENT DOCUMENTS

| | | |
|---|---|---|
| JP | 2008057435 A * | 3/2008 |
| JP | 2008-213699 | 9/2008 |
| JP | 2010-058769 | 9/2008 |
| JP | 2009-012520 | 1/2009 |
| JP | 2010-163879 | 7/2010 |
| JP | 2010-223263 | 10/2010 |
| JP | 2012-071790 | 4/2012 |
| JP | 2012-122497 | 6/2012 |
| JP | 2012-145117 | 8/2012 |
| JP | 2012-219667 | 11/2012 |
| JP | 2012-237206 | 12/2012 |
| JP | 2012-255384 | 12/2012 |
| WO | WO 2012/128021 | 9/2012 |
| WO | WO 2012/164677 A1 | 12/2012 |

* cited by examiner

[Fig 1]
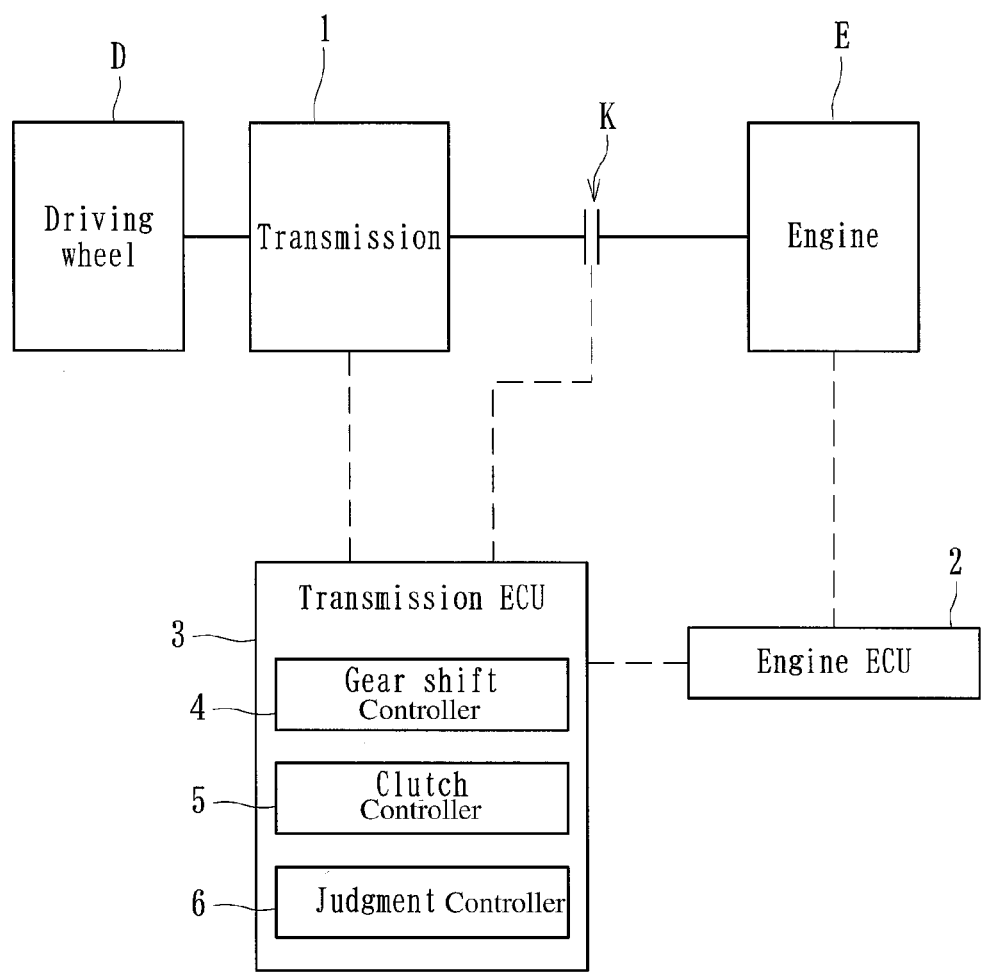

[Fig 2]
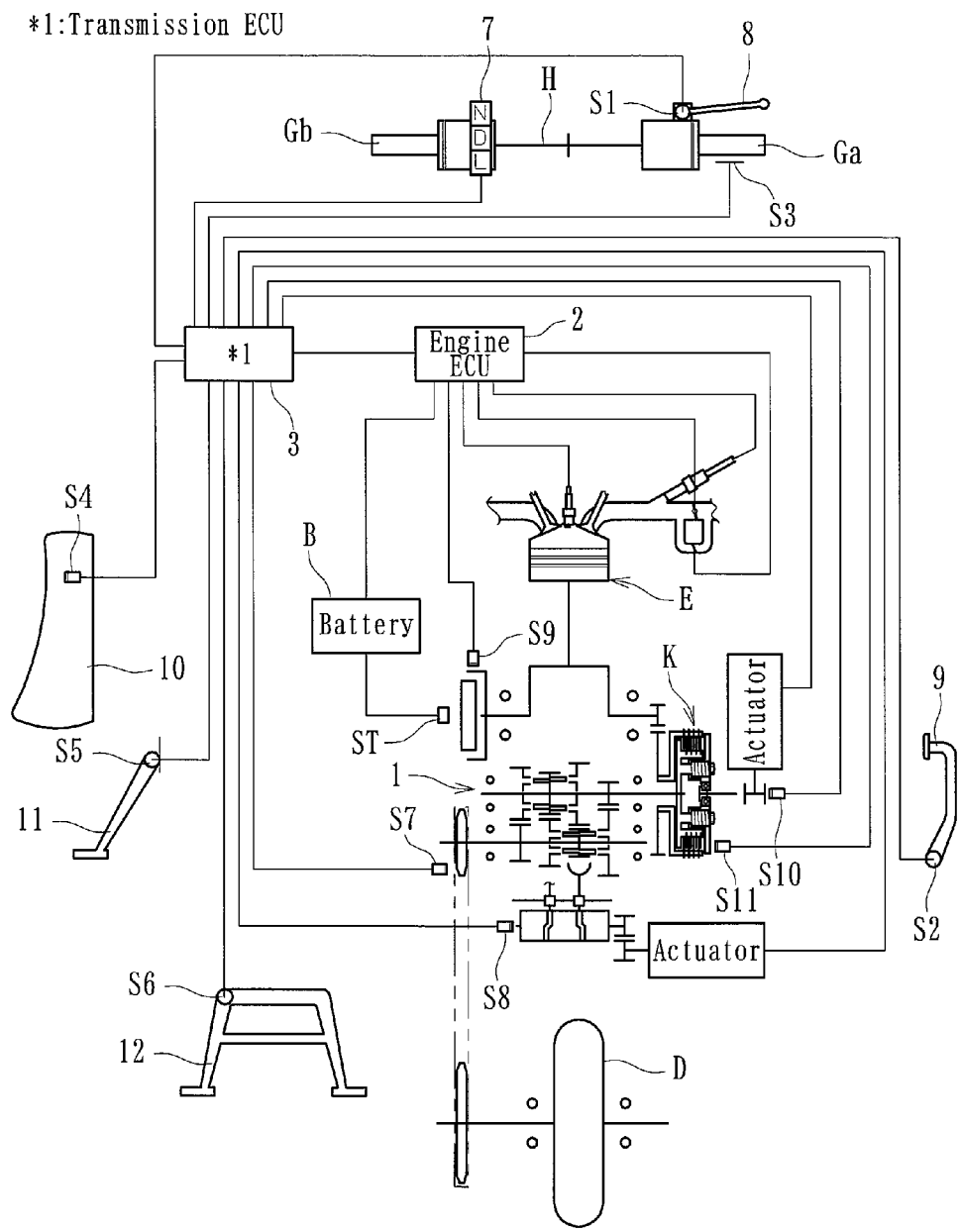

[Fig 3]

| Engine start method | Engine start condition | Clutch control | Dog clutch control |
|---|---|---|---|
| Accelerator operation | ON | Steady travel control (Start control in case of start) | ON |
| First brake Second brake | OFF | Creep control or Idle-neutral control | ON |
| Vehicle speed | Increase | Idle-neutral control | ON |
| Battery | Reduction of remaining battery | | |
| Idle-stop time | Progress of predetermined time | | |
| Transmission range operation | D → N | OFF | ON ⇒ OFF |
| | L → N | OFF | ON ⇒ OFF |

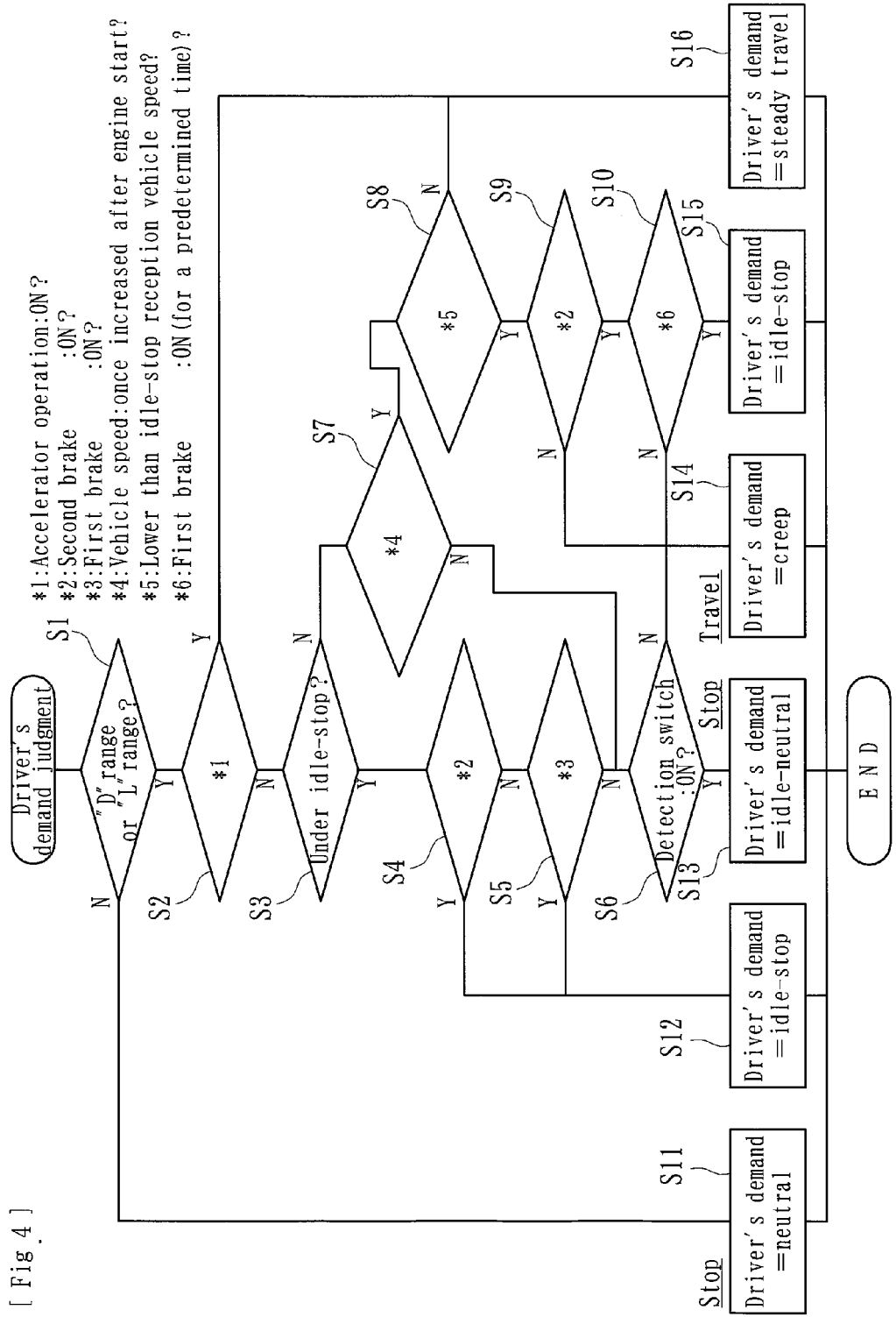
[Fig. 4]

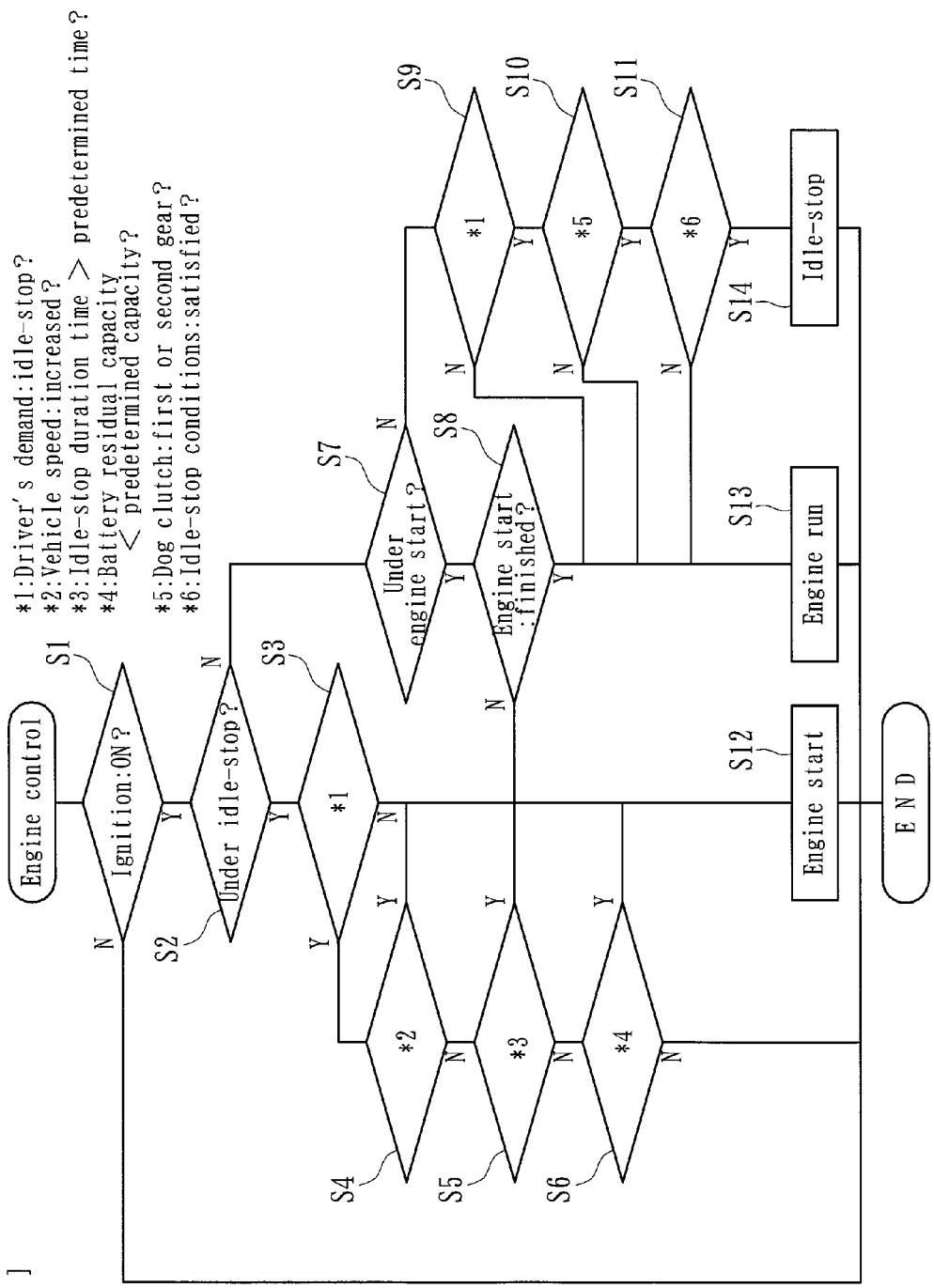
[Fig 5]

[Fig 6]
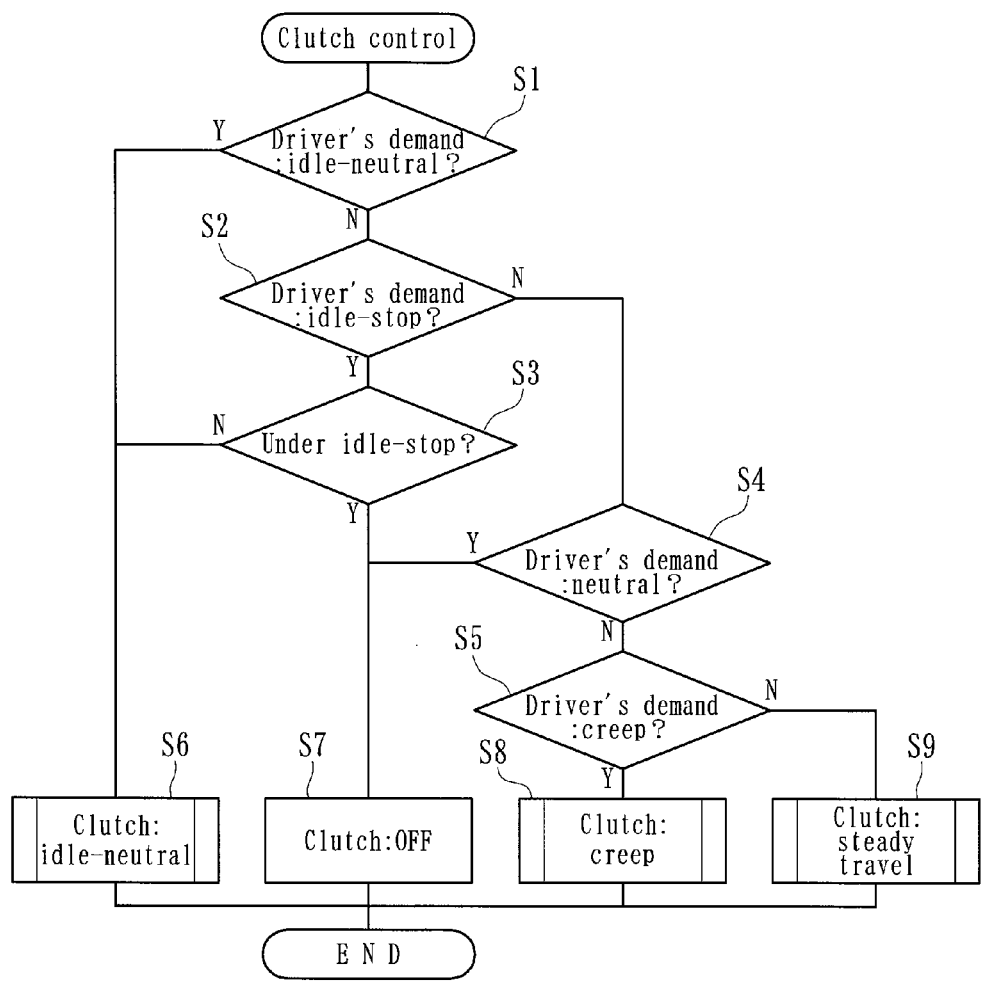

[Fig 7]
Clutch torque capacity (TC)
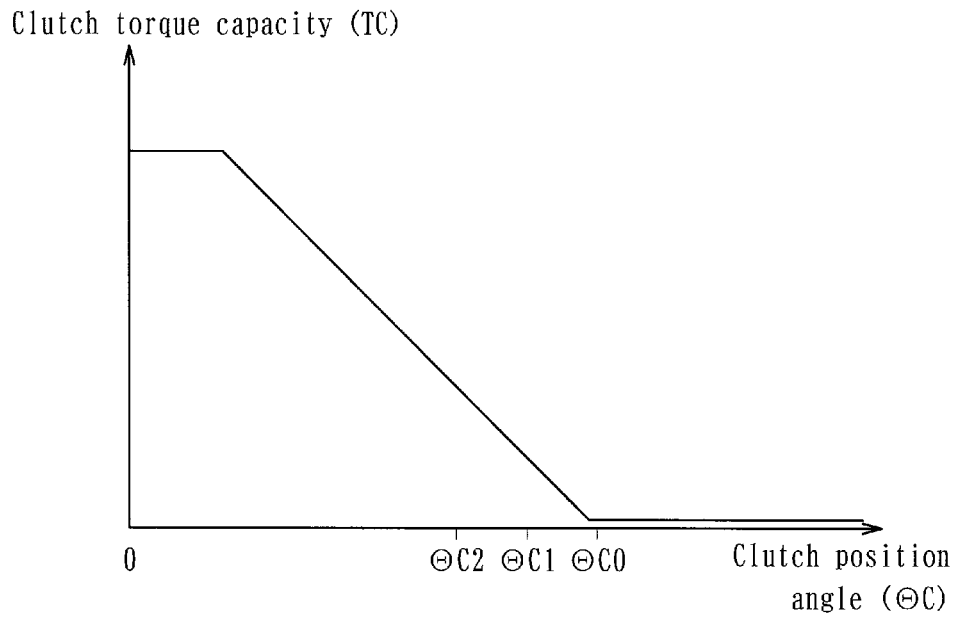
Clutch position angle ($\Theta C$)
[Fig 8]
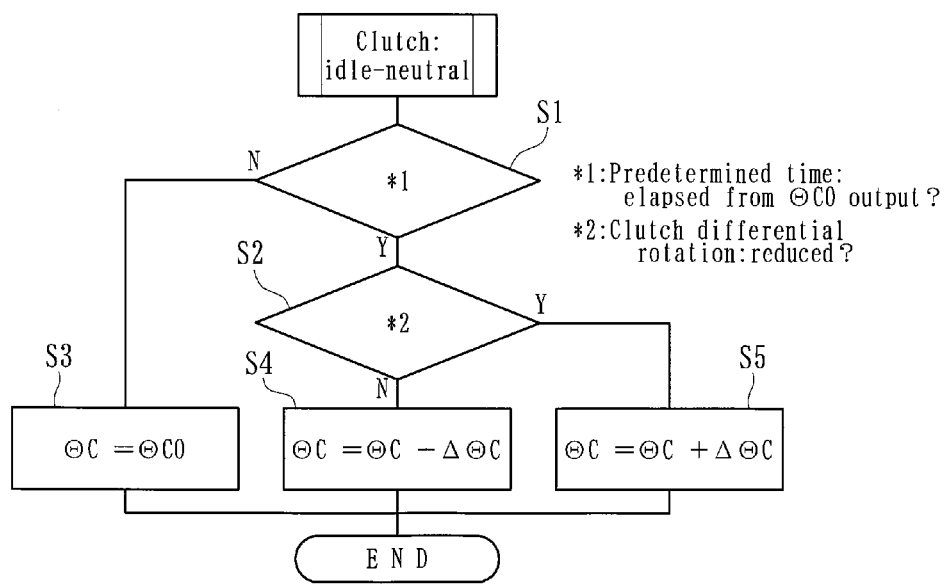
*1: Predetermined time: elapsed from $\Theta C0$ output?
*2: Clutch differential rotation: reduced?

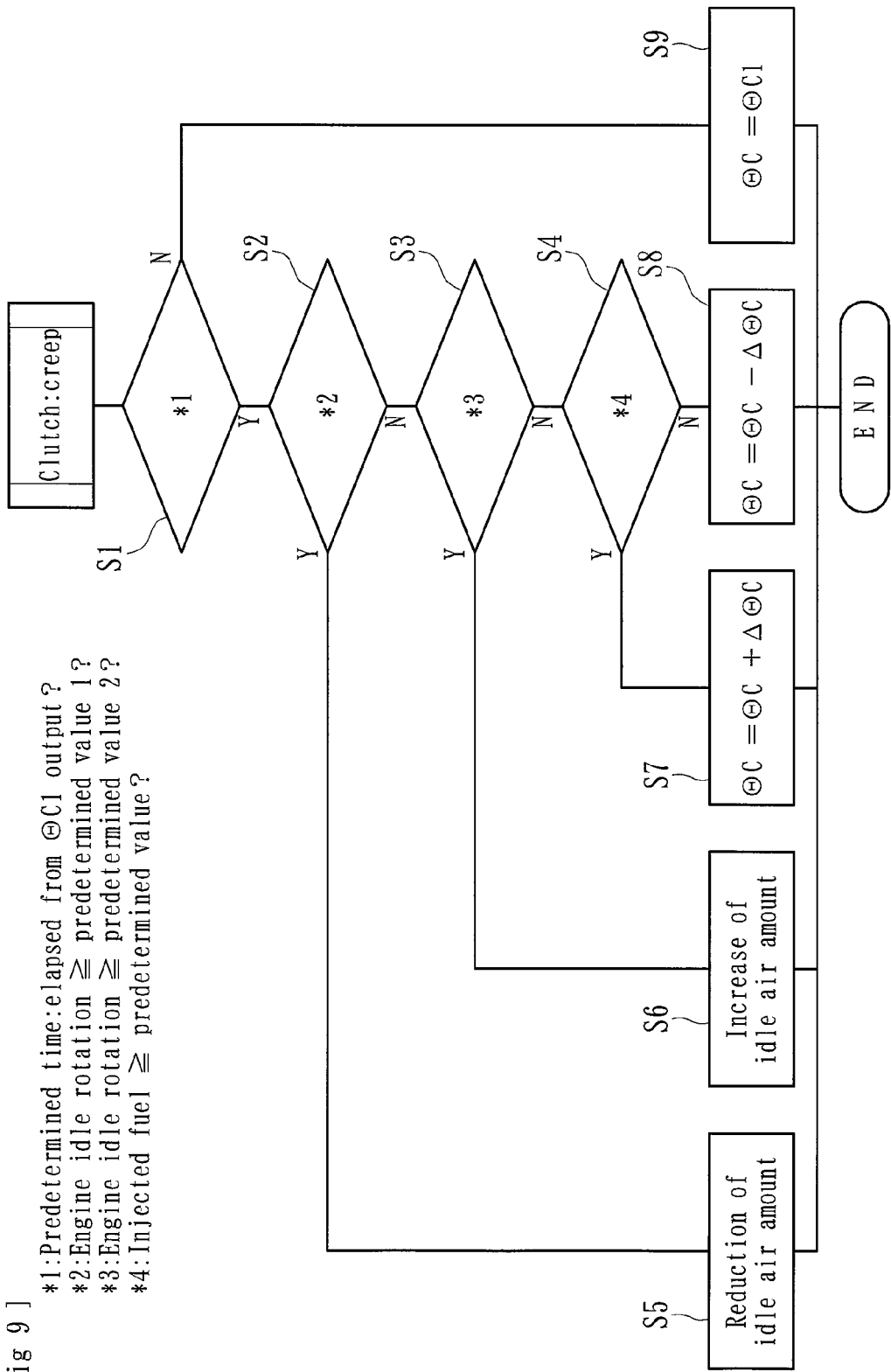
[Fig 9] *1: Predetermined time: elapsed from ⊖C1 output?
*2: Engine idle rotation ≧ predetermined value 1?
*3: Engine idle rotation ≧ predetermined value 2?
*4: Injected fuel ≧ predetermined value?

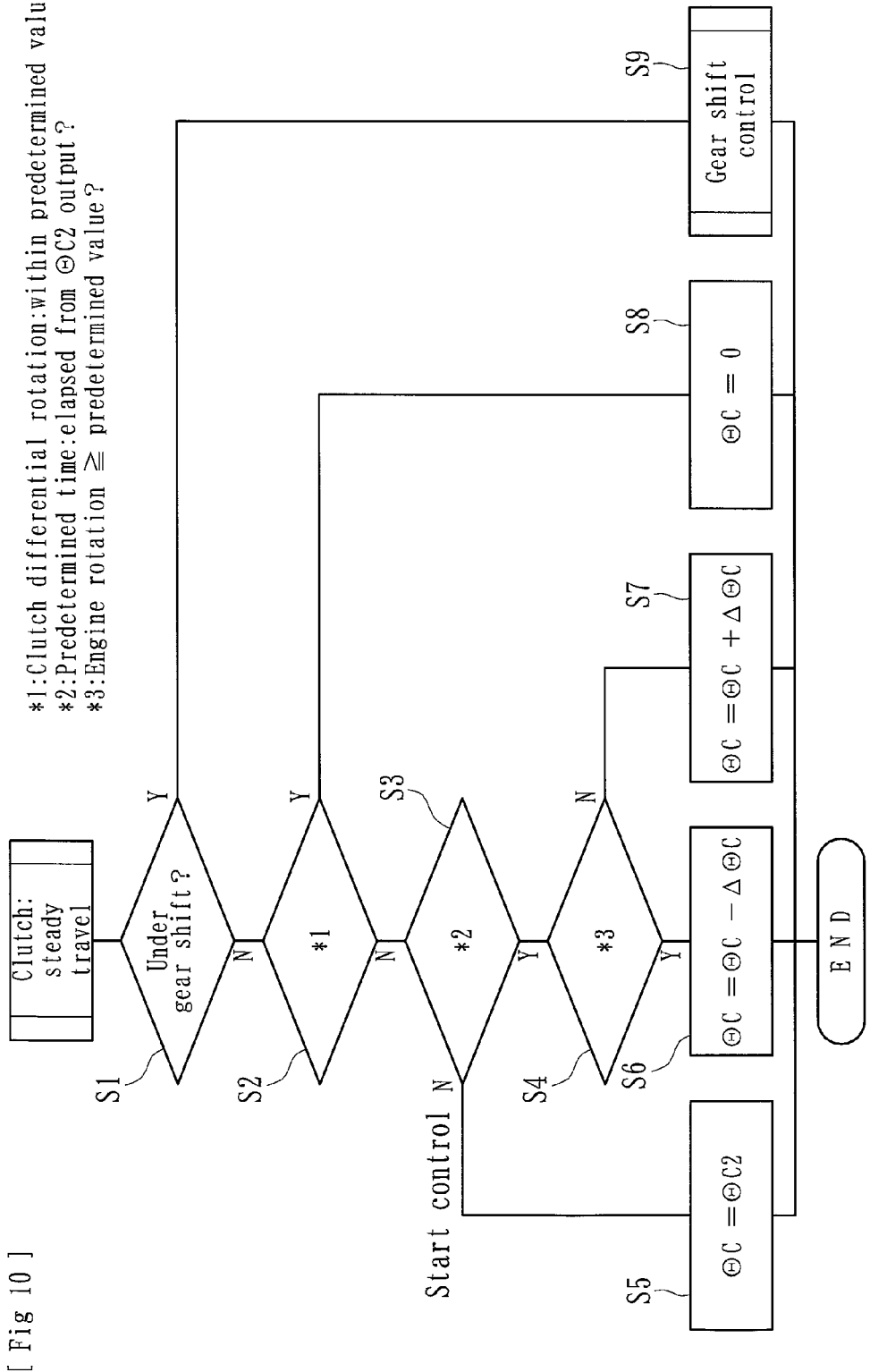
[Fig 10]

[Fig 11]
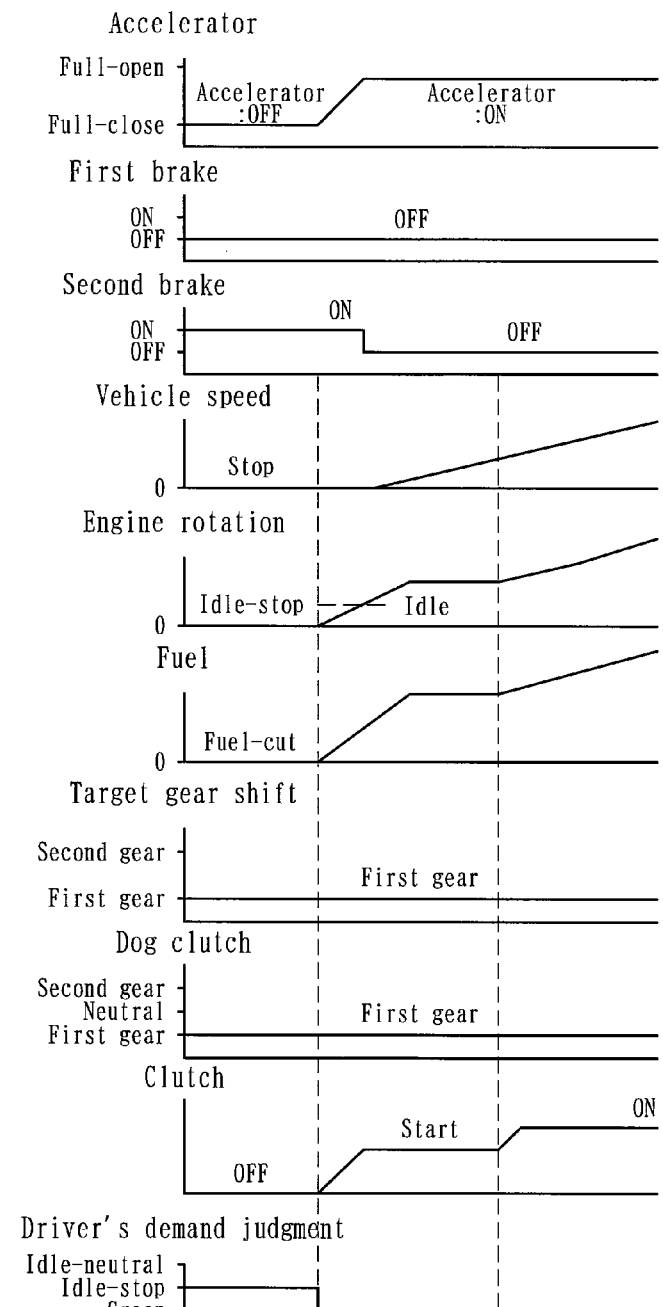

[Fig 12]
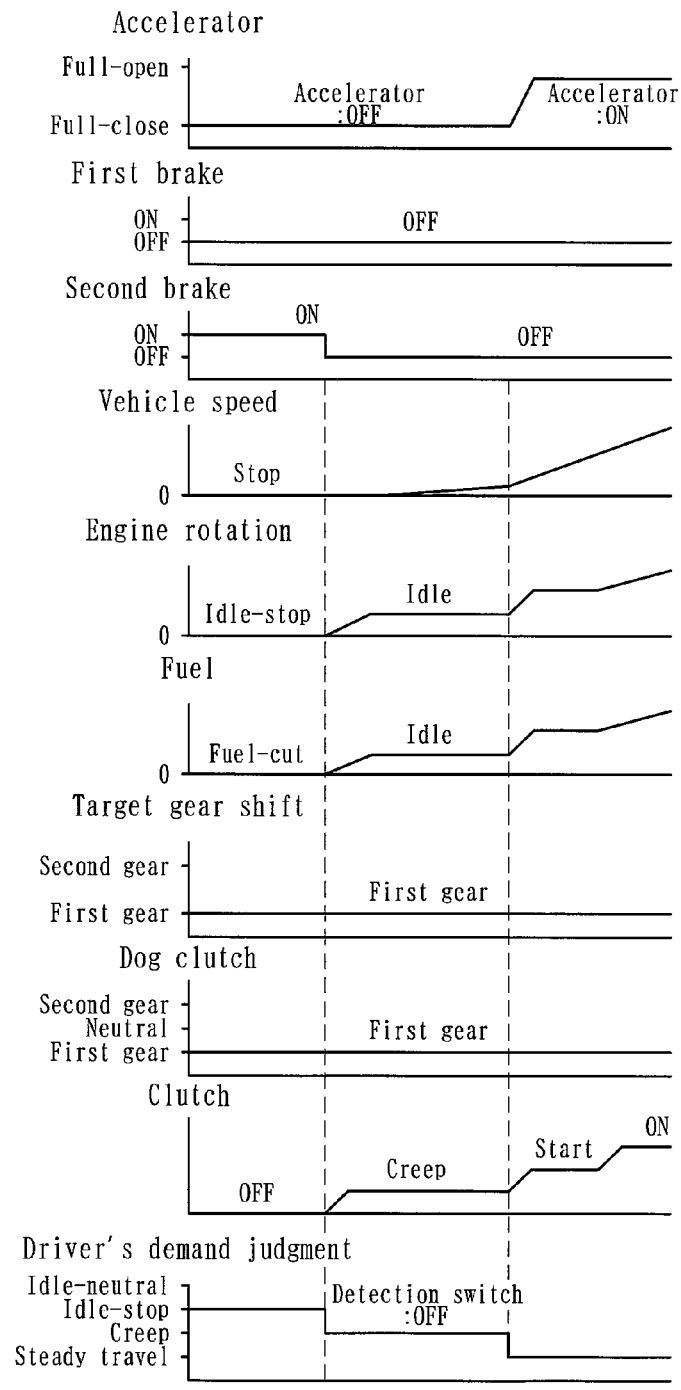

[Fig 13]
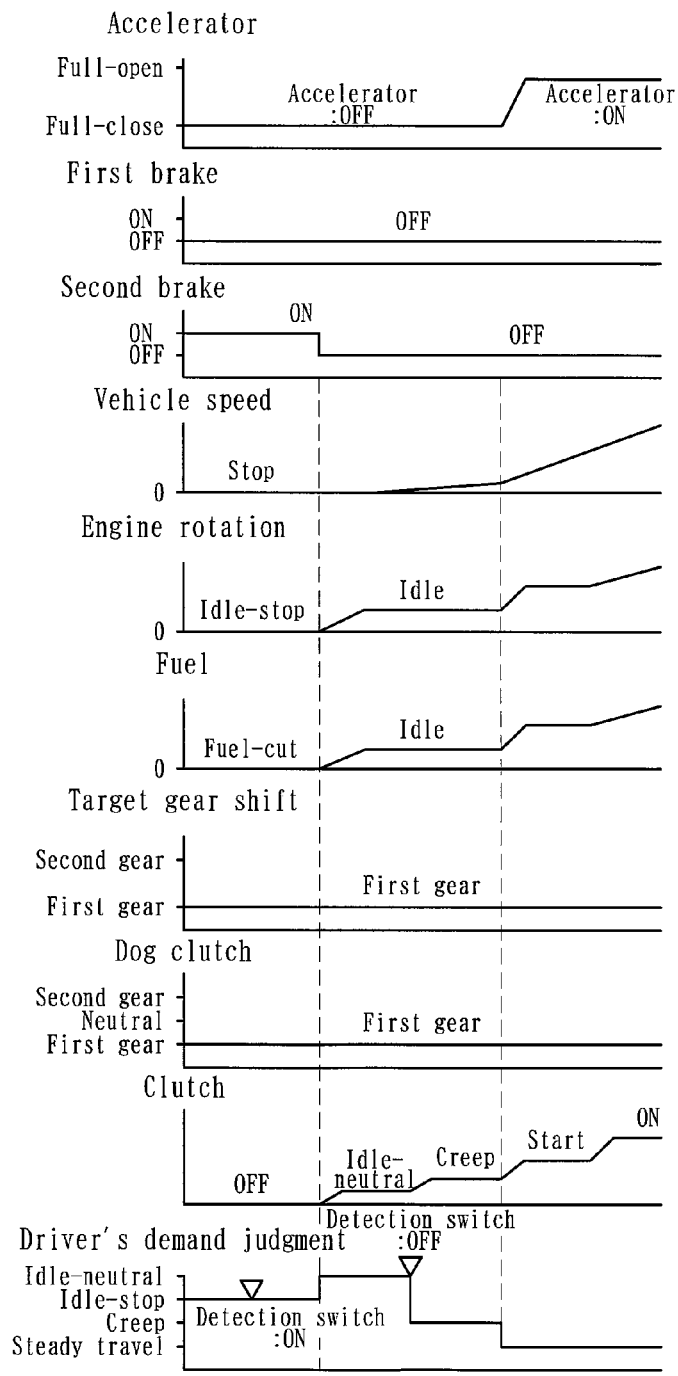

[Fig 14]
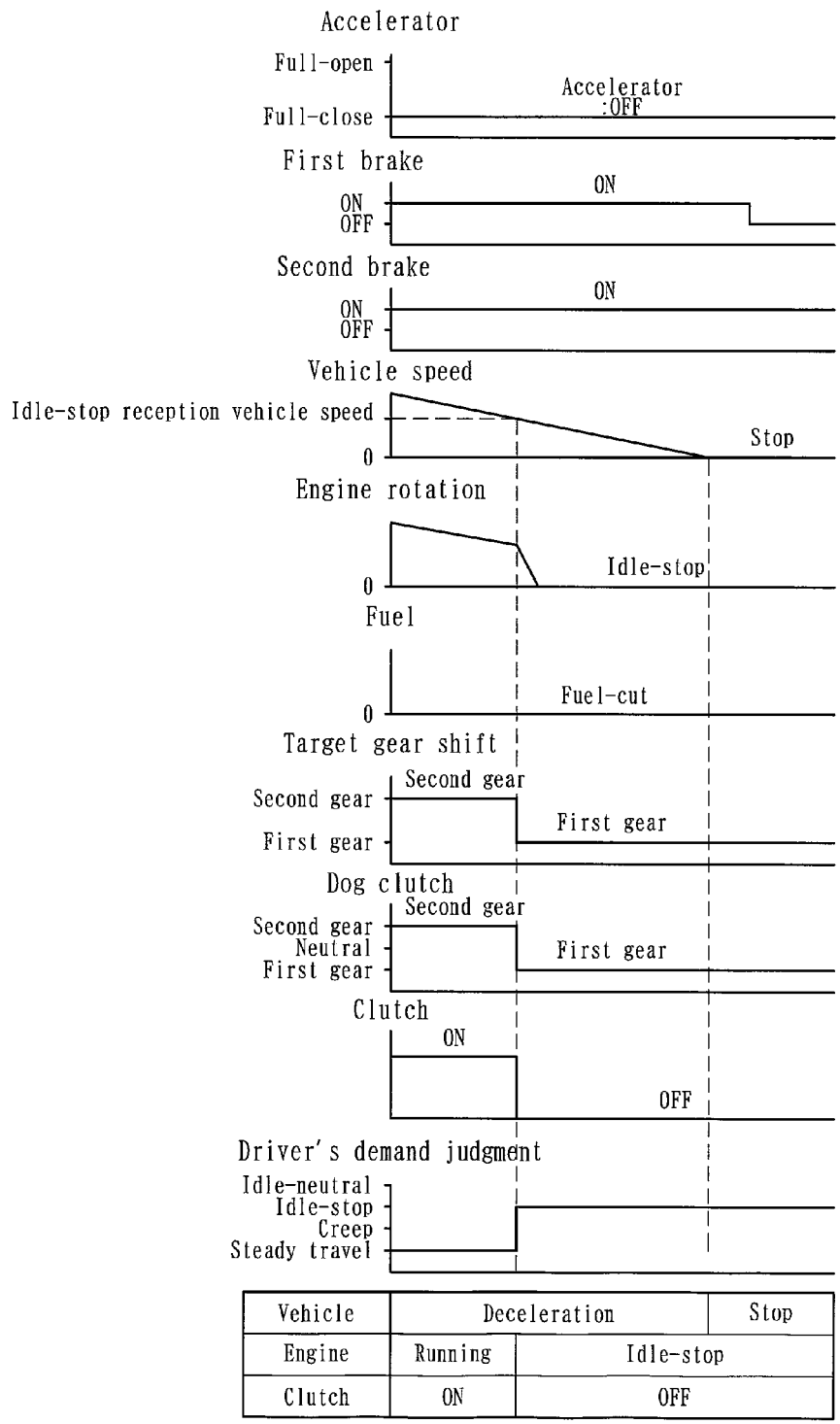

[ Fig 15 ]
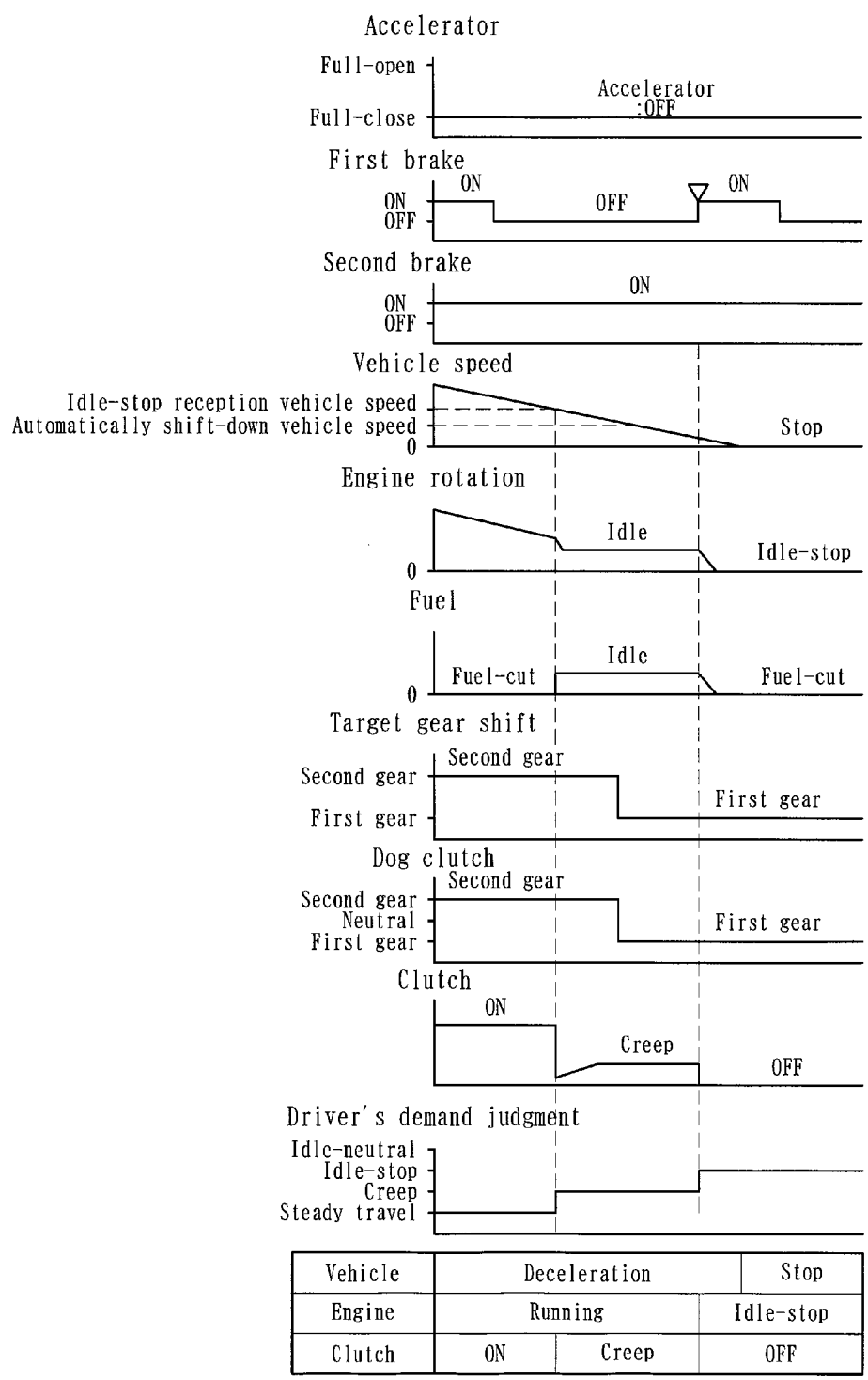

[Fig 16]
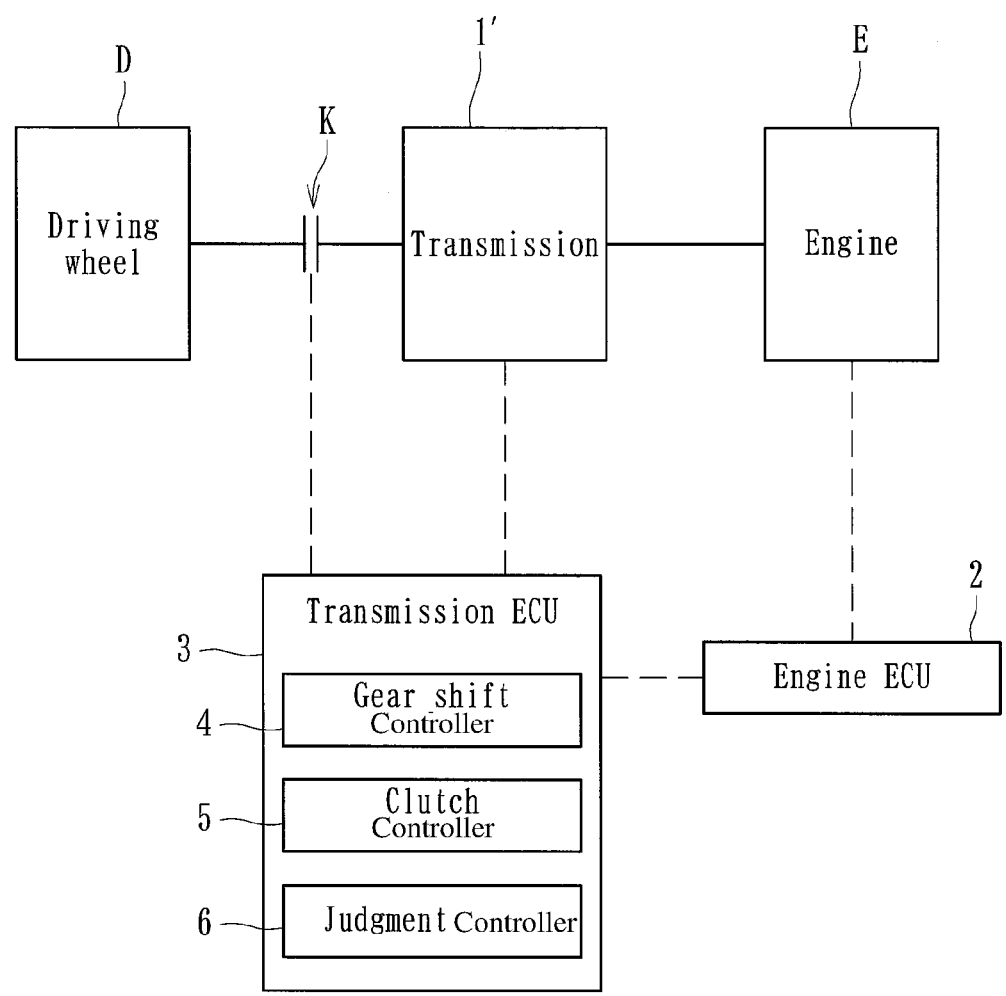

[Fig 17]
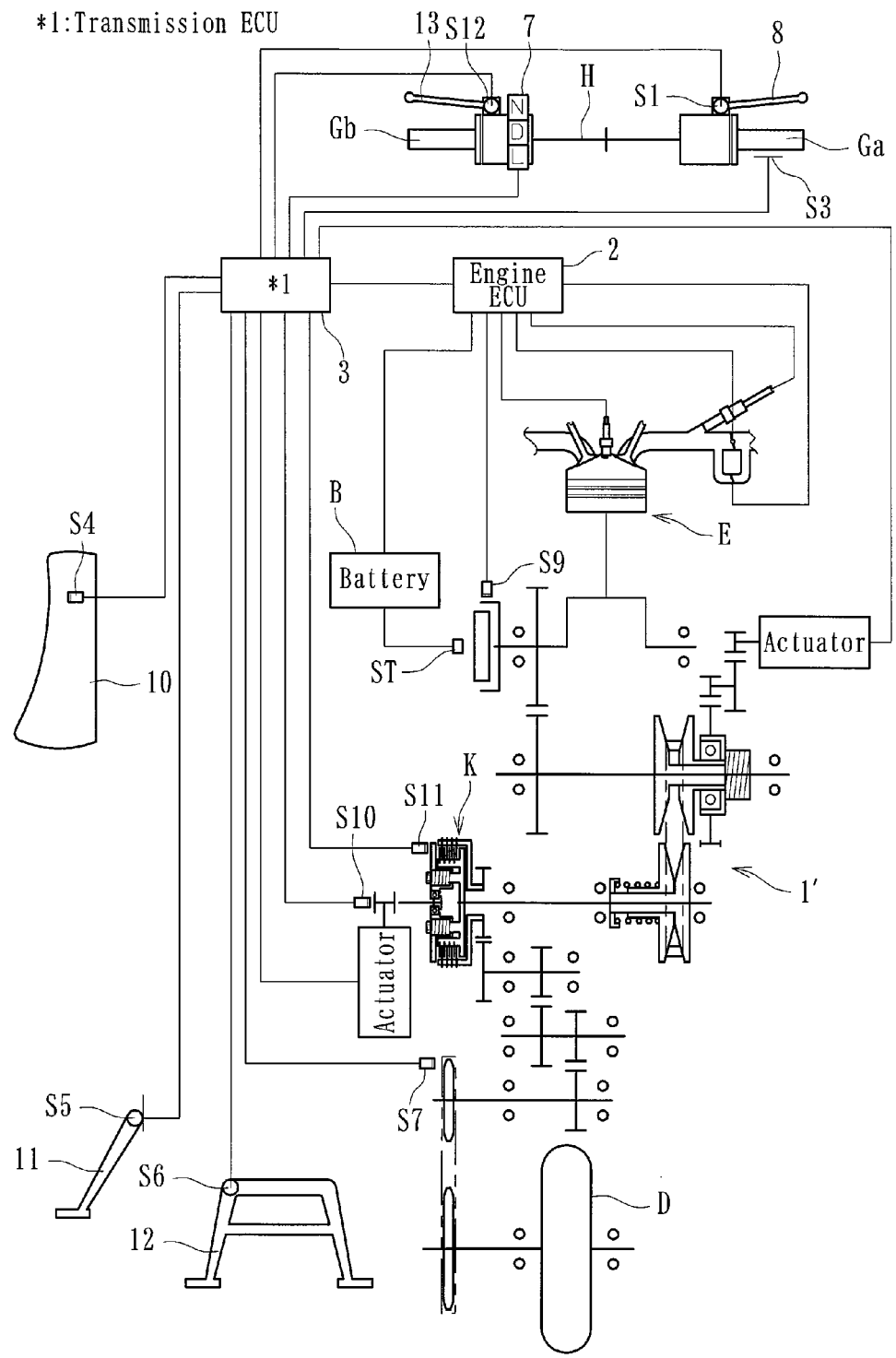

SADDLE-TYPE VEHICLE

INCORPORATION BY REFERENCE TO ANY PRIORITY APPLICATIONS

Any and all applications for which a foreign or domestic priority claim is identified in the Application Data Sheet as filed with the present application, or any corrections thereto, are hereby incorporated by reference under 37 CFR 1.57.

BACKGROUND

Field of the Disclosure

The present disclosure relates to saddle-type vehicles driven by a driver straddling on a seat with steering a bar handle.

Description of the Related Art

In recent years, vehicles have been provided with an idle-stop apparatus for automatically stopping an engine when a vehicle is stopped in view of improvement of fuel consumption and environmental problems. Although the idle-stop apparatus have been applied to many four-wheeled vehicles such as automobiles, it is recently proposed to apply the idle-stop apparatus to the saddle-type vehicles such as two-wheeled vehicles with a bar handle for steering driven by a driver straddling on a seat.

For example, as disclosed in JP 2010-163879 A, it is shown a two-wheeled vehicle provided with an idle-stop apparatus which is structured so that the idle-stop can be achieved subject to conditions of vehicle speed lower than a predetermined speed, in addition to throttle opening, presence or absence of a driver on a seat. Thus, the idle-stop is performed by stopping an engine just before stop of a vehicle and accordingly, it is possible to keep the fuel-cut state during deceleration of a vehicle until stop of a vehicle and thus to improve the fuel consumption.

SUMMARY

Although the idle-stop apparatus of the prior art can improve the fuel consumption to some extent by performing the idle-stop with stopping an engine just before stop of a vehicle during deceleration, since the idle-stop is performed without judging a demand of a driver, a problem would be created in that it is difficult to achieve speed control by a delicate accelerator operation necessary for two-wheeled vehicles during idle-stop during a low speed travel (e.g., during a right turn or left turn at a crossing) against a driver's will.

Thus, it can be beneficial to provide a saddle-type vehicle which can perform the idle-stop during deceleration corresponding to a driver's demand.

Thus, in some embodiments, a saddle-type vehicle which can be driven by a driver straddling on a seat with steering a bar handle has the bar handle having opposite tip ends, the bar handle on one tip end having a grasping grip configured to be grasped by a driver and a throttle grip on the other tip end for accelerator operation. The vehicle can have two operation controllers (which can serve as operation means and/or actuator) configured to perform braking operation, at least one of the operation controllers being one of a first brake (which can serve as a first brake means) and a second brake (which can serve as a second brake means) and at least one of the first and second brakes being mounted on a tip end of the bar handle. The vehicle can include an engine controller (which can serve as an engine control means) configured to automatically stop an engine and transitioning the engine to an idle-stop state. In some embodiments, the saddle-type vehicle further comprises a judgment controller (which can serve as a judgment means) configured to judge whether a simultaneous operation of the first and second brakes has been achieved. In some embodiments, the engine controller is configured to perform the idle-stop during deceleration of the vehicle when the controller judges that the simultaneous operation of the first and second brakes has been performed.

In some embodiments, the first brake comprises a lever or other operation controller (each of which can serve as an operating means) mounted on the tip end of the bar handle to which the throttle grip is mounted.

In some embodiments, the controller is configured to judge that the simultaneous operation of the first and second brakes has been performed when the second brake has been operated and the first brake is continuously operated for a predetermined period of time.

In some embodiments, the controller is configured to judge when the speed of a vehicle is lower than a predetermined speed and make the engine controller perform the idle-stop when the controller determines that the vehicle speed is lower than the predetermined speed and that the first and second brakes are simultaneously operated.

In some embodiments, the vehicle further comprises a clutch controller (which can serve as a clutch control means) configured to perform creep control to enable travel of a vehicle without accelerator operation by controlling a clutch during the idling state of the engine. In some embodiments, the creep control by the clutch controller can be performed when the of the controller judges that the vehicle speed is lower than the predetermined speed, that the accelerator operation by the throttle grip is not made, and that the simultaneous operation of the first and second brakes is not performed.

In some embodiments, the vehicle further comprises a stepwise variable transmission provided with a dog clutch, and wherein the idle-stop by the engine controller is configured to be performed subject to judgment of the controller that a dog clutch of the stepwise variable transmission is in a power transmission state and a simultaneous operation of the first and the second brakes is performed.

In some embodiments, the vehicle further comprises a continuously variable transmission, and wherein the idle-stop by the engine controller is configured to be performed subject to judgment of the controller that a gear ratio of the continuously variable transmission is a predetermined value or more and a simultaneous operation of the first and second brakes is performed.

According to some embodiments, since the saddle-type vehicle further comprises a controller configured to judge whether a simultaneous operation of the first and second brakes has been achieved, and since the engine controller performs the idle-stop during deceleration of the vehicle when the controller judges that the simultaneous operation of the first and second brakes has been performed, it is possible to perform the idle-stop during deceleration corresponding to a driver's demand.

According to some embodiments, since the first brake comprises an operation controller mounted on a tip end of the bar handle on a side of the bar handle to which the throttle grip is mounted, it is possible to judge that the accelerator operation by the throttle grip is not performed when the first brake is operated in addition to the operation of the second brake, and that the driver's demand is to perform the idle-stop. Accordingly, it is possible to surely perform the idle-stop during deceleration of a vehicle corresponding to the driver's demand.

According to some embodiments, since the controller judges that the simultaneous operation of the first brake and the second brake has been performed when the second brake has been operated and the first brake is continuously operated for a predetermined period of time, it is possible to judge that the accelerator operation by the throttle grip has not performed for a predetermined period of time and thus the driver's demand is to perform the idle-stop. Accordingly, it is possible to surely perform the idle-stop during deceleration of a vehicle corresponding to the driver's demand.

According to some embodiments, since the controller can judge that the speed of a vehicle is lower than a predetermined speed and make the engine controller perform the idle-stop subject to judgment that the vehicle speed is lower than the predetermined speed in addition when the first and second brakes are simultaneously operated, it is possible for designers of vehicle to arbitrarily set the timing of idle-stop and thus to improve the freedom of design.

According to some embodiments, since the vehicle comprises a clutch controller configured to performing creep control to enable travel of a vehicle without accelerator operation by controlling a clutch during the idling state of the engine, and the creep control by the clutch controller can be performed subject to judgment of the controller that the vehicle speed is lower than the predetermined speed, that accelerator operation by the throttle grip is not made, and that the simultaneous operation of the first and the second brakes is not performed, it is possible to selectively perform the idle-stop or creep control corresponding to the driver's demand.

According to some embodiments, since the vehicle further comprises a stepwise variable transmission provided with a dog clutch, and the idle-stop by the engine controller can be performed subject to judgment of the controller that a dog clutch of the stepwise variable transmission is under a power transmission state and the simultaneous operation of the first and the second brakes is performed, it is possible to accurately perform selection of the gear step according to a vehicle speed and also to perform a more rapid and smooth start of vehicle when starting the vehicle by starting the engine from the idle-stop state.

According to some embodiments, since the vehicle comprises a continuously variable transmission, and the idle-stop by the engine controller can be performed subject to judgment of the controller that the gear ratio of the continuously variable transmission is the predetermined value or more and the simultaneous operation of the first and the second brakes is performed, it is possible to more smoothly perform gear shift and thus to perform a more rapid and smooth start of vehicle when starting the vehicle by starting the engine from the idle-stop state.

BRIEF DESCRIPTION OF THE DRAWINGS

FIG. 1 illustrates a block diagram showing a concept of the saddle-type vehicle according to a first embodiment of the present disclosure;

FIG. 2 illustrates a schematic view showing a general structure of the saddle-type vehicle of FIG. 1;

FIG. 3 illustrates a table showing engine start conditions and control contents for starting the engine from the idle-stop state of the saddle-type vehicle of the present disclosure;

FIG. 4 illustrates a flowchart showing control contents for performing judgment of the controller of the saddle-type vehicle of the present disclosure;

FIG. 5 illustrates a flowchart showing control contents of the engine controller of the saddle-type vehicle of the present disclosure;

FIG. 6 illustrates a flowchart showing control contents of the clutch controller of the saddle-type vehicle of the present disclosure;

FIG. 7 illustrates a graph showing a relation between the clutch position angle and the clutch torque capacity;

FIG. 8 illustrates a flowchart showing control contents of the clutch torque capacity during the idle-neutral control of the saddle-type vehicle of the present disclosure;

FIG. 9 illustrates a flowchart showing control contents of the clutch torque capacity during the creep control of the saddle-type vehicle of the present disclosure;

FIG. 10 illustrates a flowchart showing control contents of the clutch torque capacity during the travel of vehicle;

FIG. 11 illustrates a time chart showing the start control of the saddle-type vehicle of the present disclosure;

FIG. 12 illustrates a time chart showing the creep control and start control of the saddle-type vehicle of the present disclosure;

FIG. 13 illustrates a time chart showing the idle-neutral control, creep control and start control of the saddle-type vehicle of the present disclosure;

FIG. 14 illustrates a time chart showing the idle-stop during travel of the saddle-type vehicle of the present disclosure;

FIG. 15 illustrates a time chart showing the idle-stop during the creep control and travel of the saddle-type vehicle of the present disclosure;

FIG. 16 illustrates a block diagram showing a concept of the saddle-type vehicle according to another embodiment of the present disclosure;

FIG. 17 illustrates a schematic view showing a general structure of the saddle-type vehicle of FIG. 16.

DETAILED DESCRIPTION

Preferable embodiments including various combinations of the present invention are described below with reference to the accompanying drawings.

A saddle-type vehicle, in accordance with some embodiments, is shown as a two-wheeled vehicle configured to be driven by a driver sitting on a seat and steering a bar handle. The vehicle can comprise, as shown in FIGS. 1 and 2, an engine E, a bar handle H, a first brake 8 (which can serve as a first brake means) and a second brake 9 (which can serve as a second brake means) including two operation controllers (which can serve as operation means) for braking, a stepwise transmission 1, a clutch K, an engine ECU 2 as an engine controller (which can serve as an engine control means), a transmission ECU 3, and/or a transmission range operation controller 7 (which can serve as an operation control means). A reference character "ST" denotes a starter for starting the engine E.

The bar handle H can be a steering handle one tip end of which is a grasping grip Gb adapted to be gripped by a driver's hand (e.g., left hand) and the other tip end of which is a throttle grip Ga configured to be gripped by a driver's other hand (e.g., right hand) and rotated for accelerator operation. A transmission range operation controller 7 can also be mounted on the bar handle H at the base end position of the grasping grip Gb. Modes (e.g., "N" range, "D" range and "L" range) of the transmission 1 can be arbitrarily changed with a driver arbitrarily operating the transmission range operation controller 7 by his hand (e.g., left hand) grasping the grip Gb.

The throttle grip Ga can be operated via rotation by a driver and opening and closing of a throttle (fuel injection valve) of the engine E to have a desired vehicle speed. In addition, a switch case can be mounted on the bar handle H at a base end position of the throttle grip Ga and can be configured to operate various electric parts of the vehicle.

A first brake 8 can be mounted on a tip end of the bar handle H at a side of the throttle grip Ga and can extend from the base end side of the throttle grip Ga. The first brake 8 can comprise a lever configured to be swingably operated by a driver grasping the throttle grip Ga and the vehicle (e.g. two-wheeled vehicle) can be braked by a front wheel brake (not shown) when the swing motion of the lever is detected by a brake operation detection sensor S1.

In addition, the vehicle can be provided with a second brake 9 operated by a foot of a driver. The second brake 9 can comprise a foot brake operated by a driver sitting on the seat 10 and the vehicle (e.g. two-wheeled vehicle) can be braked by a rear wheel brake (not shown) when the braking operation of the foot brake is detected by a brake operation detection sensor S2.

In some embodiments, the vehicle comprises detection sensors S6 and S5 for detecting states (whether used state or unused state) respectively of a main stand 12 and a side stand 11 configured to support the vehicle, a detection sensor S4 configured to detect whether the seat 10 is used, and/or a detection sensor S3 configured to detect whether the throttle grip Ga is grasped. The detection sensor S3 may be a sensor which can be configured to detect whether the throttle grip Ga and/or the grasping grip Gb are grasped. These detection sensors S3-S6 can be electrically connected to the transmission ECU 3 and can be configured to transmit detected signals to the transmission ECU 3.

The clutch K and the transmission 1 can be arranged in the power transfer path of the power transmitting system from the engine E to the driving wheel D. The transmission 1 shown in the embodiment of FIG. 1 can be a stepwise transmission provided with a dog clutch which can be configured to automatically shift to a predetermined gear step in accordance with modes set by the transmission range operation controller 7. Such a transmission 1 can be controlled by a gear shift controller 4 (which can serve as a gear shift control means) of the transmission ECU 3 and changed to a state for transmitting the driving power of the engine E to the driving wheel D when it is set to a "D" range (e.g., first gear ⇔ second gear ⇔ third gear ⇔ fourth gear automatic gear shift in some embodiments) and "L" range (second gear ← third gear, however usually being fixed at second gear and outputted to third gear only when changed from high speed "D" range to "L" range) and also changed to a state for not-transmitting the driving power of the engine E to the driving wheel D when it is set to a "N" range (neutral).

The clutch K can be a multiple disc clutch arranged between the engine E and the transmission 1 in the power transmitting system and can be adapted to transmit and cut off the driving power of the engine E to the driving wheel D at an arbitrary and selective timing. The clutch K can be switched by the clutch controller 5 (which can serve as a clutch control means) between an "ON" state in which the driving power of the engine E can be transmitted to the driving wheel D and an "OFF" state in which the driving power of the engine E cannot be transmitted to the driving wheel D.

The clutch K of some embodiments is provided with a clutch position angle sensor S10 and a clutch rotation sensor S11. Detected signals from these sensors S10, S11 can be transmitted to the transmission ECU 3. The press-contacted condition of clutch discs can be determined from the detected signals and the clutch torque capacity (TC) of the clutch K can be detected.

The engine ECU (e.g., engine controller) 2 can comprise a microcomputer or other controller mechanism configured to control the engine E. The engine ECU 2 can be supplied with electric power from a battery B of the vehicle and can be electrically connected to the transmission ECU 3 for transmitting and receiving electric signals therebetween. The engine ECU 2 can be configured to perform the idle-stop and automatically stop the engine when predetermined conditions are satisfied. The "idle-stop" can be defined as a condition in which the idling rotation of engine E is stopped when predetermined conditions are satisfied to suppress the fuel consumption.

Similarly to the engine ECU 2, the transmission ECU 3 can include a microcomputer or other controller mechanism electrically connected to the engine ECU 2 for transmitting and receiving electric signals therebetween as well as electrically connected to actuators of the transmission 1 and the clutch K. As shown in FIG. 1, the transmission ECU 3 can be formed of a gear shift controller 4 (which can serve as a gear shift control means) configured to control the transmission 1, a clutch controller 5 configured to control the clutch K and a judgment controller 6 (which can serve as a judgment means).

As shown in FIG. 2, the transmission ECU 3 is further electrically connected to a vehicle speed sensor S7 configured to detect the vehicle speed and a shift-drum angle sensor S8 configured to detect states (e.g., states of transmission and interruption of power) of the dog clutch of the transmission 1 and accordingly is configured to grasp the states of the vehicle speed and the dog clutch. A reference character "S9" denotes an engine rotation sensor electrically connected to the engine ECU 2.

In some embodiments, the judgment controller 6 is configured to judge whether a simultaneous operation of the first brake 8 and second brake 9 has been achieved and is structured so that it makes the engine ECU (engine controller) 2 perform the idle-stop during deceleration of the vehicle subject to judgment of the judgment controller 6 that simultaneous operation of the first and second brakes 8, 9 by a driver has been performed.

In some embodiments, the judgment controller 6 is structured so that it is configured to judge that the first and second brakes 8, 9 have been simultaneously operated when the second brake 9 was operated and the first brake 8 (operation controller mounted on the tip end of the bar handle H at a side on which the throttle grip Ga is mounted) was continuously operated for a predetermined period of time. It is also possible to structure the judgment controller 6 so that it is configured to judge that the simultaneous operation of the first and second brakes 8, 9 has been performed at a time on which the second brake 9 was operated and then the first brake 8 was operated.

In some embodiments, the judgment controller 6 is able to judge that the vehicle speed is lower than the predetermined speed by electric signals from the vehicle speed sensor S7 and is structured so that it makes the engine ECU (engine controller) 2 perform the idle-stop (idle stop during deceleration and stop of a vehicle) when the vehicle speed is lower than the predetermined speed (this is referred to as "idle-stop reception vehicle speed") and the first and second brakes 8, 9 are simultaneously operated.

In some embodiments, the clutch controller 5 is able and configured to perform the creep control enabling a vehicle to travel via operation of the clutch K under the idling state of the engine E without operation of the accelerator. The clutch controller 5 is structured to perform the creep control subject to that the judgment controller 6 judges that the vehicle speed is lower than a predetermined speed, the accelerator operation by the throttle grip Ga is not present, and that simultaneous operation of the first and second brakes 8, 9 is not present.

In some embodiments, the vehicle comprises a stepwise variable transmission (transmission 1) provided with a dog clutch, and the idle-stop by the engine ECU (engine controller) 2 can be and/or is configured to be performed subject to judgment of the judgment controller 6 that a dog clutch of the stepwise variable transmission is under a power transmission state and the simultaneous operation of the first brake 8 and the second brake 9 is performed.

The idle-stop by the engine ECU (engine controller) 2 can be performed when the judgment controller 6 judges that the dog clutch of the transmission (stepwise variable transmission) 1 is under the power transmitting state, and that the simultaneous operation of the first brake 8 and the second brake 9 is performed. This can make it possible to accurately perform selection of the gear step according to a vehicle speed and also to perform a more rapid and smooth start of vehicle when starting the vehicle via starting the engine from the idle-stop state.

For example, as shown in FIG. 14, the judgment controller 6 can be configured to judge that the driver's demand is idle-stop at a point in time when a vehicle is decelerated and reached to the idle-stop reception vehicle speed and the first and second brakes 8, 9 are simultaneously operated during deceleration of a vehicle and thus initiate the idle-stop. As shown in FIG. 15, the engine is configured to transition to the idle-stop condition when the first brake 8 is operated after judgment by the judgment controller 6 that the driver's demand is the creep control (e.g., during deceleration of the vehicle via operation of the second brake 9 while the first brake is not operated). In some embodiments, the creep control (at idling rotation of the engine E) is performed while only the second brake 9 is operated and the idle-stop (fuel-cut) is performed after the simultaneous operation of the first and second brake 8, 9 is performed.

In addition to structures described above, the two-wheeled saddle-type vehicle of some embodiments can be provided with further structures described below.

In some embodiments, the judgment controller 6 of the transmission ECU 3 can be configured to judge the driver's demand based on operation conditions of the driver relative to the vehicle when the engine E is started from the idle-stop state. The clutch controller 5 can be configured to arbitrarily and selectively select between a travel state wherein driving power is transmitted from the engine E to the driving wheel D controlling the clutch K or transmission 1 corresponding to the driver's demand judged by the judgment controller 6 and a stopped state in which the driving power of engine E is substantially not transmitted to the driving wheel D (e.g., power transmission substantially contributing to travel of vehicle is not performed) and the stopped state of vehicle is kept.

In some embodiments, during the travel state, steady travel control including a start control or a gear shift control when an accelerator operation is performed and a creep control enabling travel under the idling state of engine without any accelerator operation are selectively performed corresponding to the driver's demand judged by the judgment controller 6. On the other hand, under the stopped state, a neutral control for changing the transmission to neutral and an idle-neutral control for keeping the stopped state of vehicle under the idling state can be selectively performed corresponding to the driver's demand judged by the judgment controller 6.

That is, when releasing the idle-stop and starting the engine E with the predetermined conditions (e.g. subject to non-operated state of both the first and second brakes 8, 9) being satisfied after having been stopped in the idle-stop state (e.g. at a signal of the crossing), if the accelerator operation is made it is judged that the driver's demand is "start" and thus the start control is selected. On the other hand, if the accelerator operation is not made it is judged that the driver's demand is "travel by the creep control" and thus the creep control is selected. As described later, if judgment is made that the driver's demand is "stop" based on detections by the sensors (S3-S6) or other operation conditions, the stop state is kept (e.g., neutral control or idle-neutral control is selected in accordance with the driver's demand judged by the judgment controller 6).

As illustrated in FIG. 7, in the idle-neutral control of some embodiments, an invalid-stroke shortening control (control for shifting the clutch-position angle to ΘC0 which is a position just before rising of the clutch torque capacity (TC)) is performed. This can enable suppression of the start-time lag when the accelerator operation is performed in the idle-neutral control.

In some embodiments, the start control and the creep control under the travel state are structured so that the driving power of the engine E can be transmitted to the driving wheel D by controlling the clutch K or the transmission 1 with the start of the engine E. In addition, the judgment controller 6 of some embodiments is structured so that the stopped state of the vehicle can be kept based on detections of the detection sensors (S3-S6). That is, when the detecting sensor S3 detects that a driver does not grasp the throttle grip Ga (or the grasping grip Gb), when the sensor S4 detects that a driver is not sitting on the seat 10, or when the sensors S5, S6 detect that the side stand 11 or main stand 12 are used, it is judged by the judgment controller 6 that the driver's demand is to keep the vehicle stopped state and thus the vehicle is kept stopped state based on the judgment.

Further according to some embodiments, as shown in FIG. 3, the engine E can be started from the idle-stop state subject to that the accelerator operation has been performed or that both the first and second brakes 8, 9 have not been operated. In this case, the start control is performed subject to the accelerator operation, and the creep control or the idle-neutral control is performed subject to non-operation of both the brakes 8, 9.

Also as shown in FIG. 3, some embodiments can be structured so that the idle-neutral control can be performed when starting the engine E from the idle-stop state without depending on the driver's operation (e.g. depending on increase of vehicle speed, reduction of remaining battery level or passage of predetermined period of time of usage of the battery under idle-stop). In addition, when the shift mode range is switched from "D" range to "N" range or from "L" range to "N" range by operation of the transmission range operation controller 7, both the clutch and the dog clutch are cut off and thus the power transmission can be cut off at two places.

For example as shown in FIG. 11, when the accelerator operation is performed in the idle-stop state, it can be judged that the driver's demand is "travel (start)" and the idle-stop is released and start control is performed relative to the clutch K. In addition as shown in FIG. 12, when both the first and second brakes 8, 9 are in the non-operated state and then the accelerator operation is performed in the idle-stop state, the creep control can be performed during a period from a point at which both the first and second brakes 8, 9 are transitioned to the non-operated state to a point at which the accelerator operation is performed and then the start control can be performed after the accelerator operation.

Further as shown in FIG. 13, when both the first and second brake 8, 9 are in the non-operated state, then the detection switch (e.g. detection switch S5 of the side stand 11) is switched from ON to OFF and then the accelerator operation is performed in the idle-stop state, the idle-neutral control can be performed during a period from a point at which both the first and second brakes 8, 9 are transitioned to the non-operated state to a point at which the detection switch is switched to OFF and then the creep control can be performed during a period from a point at which the detection switch is switched to OFF to a point at which the accelerator operation is performed. After the accelerator operation is performed, the start control can be performed.

Control (i.e., control processes or steps of the judgment controller 6) for judging the driver's demand by the judgment controller 6 of the some embodiments are described below with reference to the timing chart (e.g., flowchart) of FIG. 4.

Firstly, the transmission range operation controller 7 can judge or detect whether the shifting range is set to "D" range or "L" range (S1). If not set to "D" or "L" range (i.e. set to "N" range), the neutral control is performed (e.g., as shown by step S11). On the other hand, if the shifting range is set to "D" or "L" range, the judgment controller 6 determines whether the accelerator operation is performed (e.g., as shown in step S2).

If the controller judges that the accelerator operation has been performed (e.g., at S2), it is judged that the driver's demand is "start" the steady travel control (start control in case of the start) is performed (e.g., as shown in step S16). On the other hand, if the judgment controller 6 judges that the accelerator operation has not been performed at S2, to the judgment controller 6 judges whether the vehicle is in the idle-stop condition (e.g., as shown in step S3). If judged that the vehicle is under the idle-stop, to the judgment controller 6 judges respectively whether the second brake 9 and first brake 8 have been operated (e.g., as shown in steps S4 and S5, respectively. If the judgment controller 6 judges that none of the first and second brake 8, 9 have been operated, is the judgment controller 6 judges whether any one of the detection switches (S3-S6) is actuated (e.g., as shown at S6). If judged that actuation is found in the detection switches, the controller is configured to judge that the driver's demand is "stop" and to perform the idle-neutral control (e.g., as shown in step S13).

In addition, if the judgment controller 6 judges that the second brake 9 has been operated (e.g., at S4) or judges that the first brake 8 has been operated (e.g., at S5), the judgment controller 6 can be configured to judge that the driver's demand is "keeping of idle-stop" and the controller can be configured to perform idle-stop keeping control (e.g., as shown at step S12). If none of the detection switches (S3-S6) is actuated at S6, the judgment controller 6 can be configured to judge that the driver's demand is "low speed travel not depending on the accelerator operation (e.g., travel depending on the creep phenomenon)" and to perform the creep control (e.g., as shown at S14).

On the other hand, if the judgment controller 6 that the vehicle is not under the idle-stop (e.g., at S3), and the controller judges whether the vehicle speed has been once increased after start of the engine E (e.g., as shown at step S7). If the vehicle speed has not been increased, the judgment controller 6 is configured to judge whether any one of the detection switches (S3-S6) is actuated (e.g., step S6). If the vehicle speed has been increased, and the controller is configured to judge whether the vehicle speed is lower than a predetermined speed (idle-stop reception vehicle speed), as shown at step S8. If the judgment controller 6 judges that the vehicle speed is lower than the idle-stop reception vehicle speed, the judgment controller 6 then judges whether the second brake 9 has been operated (S9) and the first brake 8 have been operated (S10). If the judgment controller 6 judges that both the first and second brakes 8, 9 have been operated (simultaneous operation), it is judged that the driver's demand is "idle-stop" and idle-stop is performed (e.g., at S15).

In addition, if the judgment controller 6 judges that the second brake 9 has not been operated at S9 or judges that the first brake 8 has not been operated at S10, the judgment controller 6 can be configured to judge that the driver's demand is "low speed travel not depending on the accelerator operation (travel depending on the creep phenomenon)" and to performs the creep control (e.g., at S14). If the vehicle speed is not lower than the predetermined speed (idle-stop reception vehicle speed) at S8, to the judgment controller 6 can be configured to perform the steady travel control (in this case, control for a normal travel), as shown at step S16.

Then, control of the engine by the engine ECU 2 according to some embodiments is described below with respect to the timing chart (e.g., flowchart) of FIG. 5.

Firstly, the engine ECU 2 can be configured to judge whether an ignition switch is ON (S1) and if the ignition switch is ON, to judge whether the vehicle is under the idle-stop (S2). If the engine ECU 2 judges the vehicle is under the idle-stop at S2, and the engine ECU 2 can be configured to judge whether the driver's demand is the idle-stop (i.e. whether the judgment controller 6 judges "idle-stop keeping control"), as shown at S3. If the engine ECU 2 judges that the driver's demand is not the idle-stop, the engine E is started (e.g., at S12).

If the engine ECU judges that the driver's demand is "idle-stop" at S3, the engine ECU 2 is configure to then judge (in some cases sequentially) whether the vehicle speed is increased (S4), whether the idle-stop has passed a predetermined period of time (S5), and whether the battery residual capacity is less than a predetermined capacity (S6). The engine ECU 2 can be configured start the engine E if any one of the inquiries S4-S6 is answered in the affirmative. If the engine ECU 2 judges that the vehicle is not in the idle-stop at S2, the engine ECU 2 can be configured to judge whether the vehicle is under engine start (e.g., as shown at S7). If the vehicle is under engine start, the engine ECU 2 can be configured to judge whether the engine start has been finished (e.g., as shown at S8). If judged that the engine start has been finished, the engine ECU 2 can be configured to perform steady travel (e.g., travel based on the accelerator operation etc.), as shown at S13. On the other hand, if the engine start has not been finished, and the engine ECU 2 can be configured to continuously perform the engine start, as shown at S12.

On the other hand, if the engine ECU 2 judges (e.g., at S7) that the vehicle is not under engine start (e.g., in travel), the engine ECU 2 can be configured to judge whether the driver's demand is idle-stop (e.g., as shown at S9). If judged that the driver's demand is not idle-stop, the steady travel is kept at S13. In addition, if judged that the driver's demand is idle-stop, the engine ECU 2 can be configured to judge (e.g., sequentially) whether the dog clutch of the transmission 1 is in first or second gear (S10) and whether the conditions for performing the idle-stop are satisfied (S11). If both these conditions are satisfied, the idle-stop is performed at S14 and if any one of these conditions is not satisfied, it advances to S13 to perform the steady travel.

Then, control of the clutch by the clutch controller 5 according to some embodiments is described below with respect to the timing chart (e.g., flowchart) of FIG. 6.

Firstly, it is judged whether the driver's demand is the idle-neutral control (S1). If it is the idle-neutral control, the idle-neutral control is performed at S6 and if it is not the idle-neutral control, the control process judges whether the driver's demand is the idle-stop (e.g., at S2).

If the driver's demand is judged to be the idle-stop, the control process proceeds to judge whether the driver's demand is in the idle-stop (e.g., S3). If the driver's demand is judged to be in the idle-stop, the clutch K is transitioned to the OFF state (e.g., state not transmitting the engine power to the driving wheel), as shown at S7. If the driver's demand is judged to be not in the idle stop (e.g. state impossible to make the engine idle-stop due to various conditions such as insufficiency of the battery capacity although the driver's demand is the idle-stop), the idle-neutral control is performed (e.g., at S6).

On the other hand, if the driver's demand is judged to be not the idle-stop (e.g., at S2), the control process proceeds to judge whether the driver's demand is "neutral" (e.g., at S4). If the driver's demand is neutral, the control process advances to transition the clutch K to the OFF state (e.g., the state not transmitting the engine power to the driving wheel), as shown at S7. If the driver's demand is not neutral, the control process advances to judge whether the driver's demand is "creep control" (e.g., at S5). If the driver's demand is the creep control, the creep control is performed (e.g., S8) and if the driver's demand is not the creep control, clutch control to the steady travel state (e.g., start control in case of start of vehicle) is performed at S9.

Then, the idle-neutral control by the clutch controller 5 of some embodiments is described below with respect to the graph of FIG. 7 and the timing chart (e.g., flowchart) of FIG. 8.

In the idle-neutral control, the invalid stroke shortening control is performed by operating an actuator based on detection signals from the clutch-position angle sensor S10 of the clutch K and the clutch rotation sensor S11. Such an invalid stroke shortening control is a control performed by setting the clutch-position angle to ($\Theta$CO) so as to make the clutch torque capacity (TC) a state just before increase from 0 (zero) as shown in FIG. 7. Shortening the invalid stroke length can reduce lag in the system by reducing the motion required by the actuator to transition the clutch K from zero torque capacity to greater than zero torque capacity.

Firstly, a judgment is made as to whether a predetermined period of time has elapsed from an output to the actuator for setting the clutch-position angle to ($\Theta$CO), as shown at S1. If the predetermined period of time has not elapsed yet, an initial clutch-position angle in the invalid stroke shortening is set to ($\Theta$C=$\Theta$C0) (e.g., at S3). If the predetermined period of time has elapsed, a feedback control for the invalid stroke shortening is initiated. This feedback control can be as follows. That is, judgment is made (e.g., as S2) as to whether the clutch differential rotation (e.g., the difference between input-side and output-side rotation speeds of the clutch K) is reduced. If the clutch differential rotation is not reduced (i.e. same or increased), the clutch-position angle is set to a value ($\Theta$C−$\Delta\Theta$C) obtained by subtracting a minute angle ($\Delta\Theta$C) from the clutch-position angle ($\Theta$C) to increase the clutch torque capacity (e.g., as shown at S4). If the clutch differential rotation is reduced, the clutch-position angle is set to a value ($\Theta$C+$\Delta\Theta$C) obtained by adding a minute angle ($\Delta\Theta$C) to the clutch-position angle ($\Theta$C) to reduce the clutch torque capacity (e.g., as shown at S5).

Then, the creep control by the clutch controller 5 of some embodiments is described below with respect to the graph of FIG. 7 and to the timing chart (e.g., flowchart) of FIG. 9.

As previously described, the creep control is a control for moving a vehicle under an idling state of the engine E to enable a low speed travel of a vehicle without the accelerator operation. Such a creep control can be performed by setting the clutch-position angle to ($\Theta$C1) so that the clutch torque capacity (TC) becomes a predetermined value as shown in FIG. 7.

Firstly, a judgment is made as to whether a predetermined period of time has elapsed from an output to the actuator for setting the clutch-position angle to ($\Theta$C1), as shown in S1. If the predetermined period of time has not elapsed yet, an initial clutch-position angle in the creep control is set to ($\Theta$C=$\Theta$C1) (e.g., at S9) and if the predetermined period of time has elapsed, a feedback control for the creep control (e.g., a feedback control for keeping the idle rotation and feedback control for keeping the clutch torque capacity) is initiated.

The feedback control for keeping the idle rotation can be as follows. That is, a judgment whether the idle rotation of the engine E is a predetermined value (1) or more is performed (e.g., S2) and a judgment whether the idle rotation of the engine E is a predetermined value (2) or less is performed (e.g., S3). If the idle rotation of the engine E is the predetermined value (1) or more (e.g., at S2), an amount of air supplied to the engine E is reduced (e.g., S5) and the idle rotation of the engine E is lowered. If the idle rotation of the engine E is the predetermined value (2) or less (e.g., at S3), an amount of air supplied to the engine E is increased (e.g., at S6) to increase the idle rotation of the engine E.

The feedback control for keeping the clutch torque capacity can be as follows. That is, a judgment as to whether an amount of fuel (e.g., injected fuel) supplied to the engine E is a predetermined value or more is performed (S4). If the amount of fuel supplied to the engine E is not the predetermined value or more, the clutch-position angle is set to a value ($\Theta$C−$\Delta\Theta$C) subtracted a minute angle ($\Delta\Theta$C) from the clutch-position angle ($\Theta$C) (e.g., at S8) to increase the clutch torque capacity. If the amount of fuel supplied to the engine E is the predetermined value or more, the clutch-position angle is set to a value ($\Theta$C+$\Delta\Theta$C) (e.g., at S7) adding a minute angle ($\Delta\Theta$C) to the clutch-position angle ($\Theta$C) to reduce the clutch torque capacity.

Then, the clutch control during travel (e.g., start control in the case of start) by the clutch controller 5 of some embodiments is described below with respect to the graph of FIG. 7 and the timing chart (e.g., flowchart) of FIG. 10.

As previously described, the clutch control during travel can be a control for causing a vehicle to travel or start based on the accelerator operation and/or other factors. Firstly, a judgment is made as to whether the clutch K is in the midst of a gear shift by an operation of the transmission range operation controller 7 (e.g., S1). If the clutch K is in the midst gear shift, the gear shift control is performed for gear shift (e.g., S9). If the clutch K is not under gear shift, a judgment is made as to whether the clutch differential rotation is within a predetermined value (e.g., S2).

If the clutch differential rotation is within the predetermined value (e.g., as determined at S2), it is judged that the steady travel is performed the clutch-position angle ($\Theta C$) is set to 0 (i.e. clutch K is set ON), as shown at S8. If the clutch differential angle is not within the predetermined value, a judgment is made as to whether a predetermined period of time has elapsed from the time of output to the actuator for setting to the clutch-position angle ($\Theta C2$) (e.g., S3). If judged in S3 that the predetermined period of time has not elapsed yet, judgment is made that the start control will be performed and the initial clutch-position angle in the start control is set ($\Theta C=\Theta C2$) (e.g., at S5). If judged that the predetermined period of time has elapsed, a feedback control for a control during travel is started.

The feedback control during travel can be as follows. That is, it is firstly judged whether the rotational speed of the engine E is a predetermined value or more (e.g., at S4). If the rotational speed of the engine E is the predetermined value or more, the clutch-position angle is set to a value ($\Theta C-\Delta\Theta C$) (e.g., at S6) subtracted a minute angle ($\Delta\Theta C$) from the clutch-position angle ($\Theta C$) to increase the clutch torque capacity. If the rotational speed of the engine E is not the predetermined value or more, the clutch-position angle is set to a value ($\Theta C+\Delta\Theta C$) (e.g., at S7) added a minute angle ($\Delta\Theta C$) to the clutch-position angle ($\Theta C$) to reduce the clutch torque capacity.

In some embodiments, a saddle-type vehicle is a two-wheeled vehicle configured to be driven by a driver sitting on a seat and steering a bar handle. The vehicle can comprise, as shown FIGS. 16 and 17, an engine E, a bar handle H, a first brake 8 and second brake 13 (which can serve as a second brake means) including two operation controllers for braking, a continuously variable transmission 1', a clutch K, an engine ECU 2 as an engine controller, a transmission ECU 3, and/or a transmission range operation controller 7. Same reference numerals are used also in connection with the embodiments illustrated in FIGS. 16 and 17 as those used above in connection with FIGS. 1-15 and detailed description of them will be omitted.

In some embodiments, the second brake 13 is mounted on a tip end of the bar handle H at a side on which a grasping grip Gb is mounted. Similarly to the first brake 8, such a second brake 13 can comprise a lever configured to be swingably operated by a driver grasping grip Gb and the vehicle (e.g., two-wheeled vehicle) can be configured to be braked by a rear wheel brake (not shown) when the swing motion of the operating lever is detected by a brake operation detection sensor S12.

In some embodiments, the transmission 1' and clutch K are arranged in the power transfer path of the power transmitting system from the engine E to the driving wheel D. The transmission 1' of some embodiments is a continuously variable transmission (CVT) which is configured to be automatically changed to a predetermined gear ratio in accordance to modes set by the transmission range operation controller 7. Such a transmission 1' is configured to be controlled by a gear shift controller 4 so that the driving power of the engine E is transmitted to the driving wheel D when the gear shift controller 4 is set at a "D" range or a "L" range. In some embodiments, the transmission 1' is configured to be controlled by the gear shift controller 4 such that the driving power of the engine E is not transmitted to the driving wheel D when the gear shift controller 4 is set at a "N" (neutral) range with the clutch K being cut off by the clutch control and transmission control (pulley control) to release side pressure of a belt and thus the transmission of driving power being cut off at two points.

According to some embodiments, the vehicle is structured such that the idle-stop is configured to be performed by the engine ECU (engine controller) 2 subject to judgment by the judgment controller 6 that the gear ratio of the transmission (continuously variable transmission) 1' is the predetermined value or more and the a simultaneous operation of the first and second brake 8, 13 has been performed. In some such cases, it is possible to more smoothly change the speed of a vehicle and thus to more rapidly and smoothly start the vehicle when starting the vehicle via starting the engine E from the idle-stop state.

According to some embodiments, since the saddle-type vehicle comprises a judgment controller 6 configured to judge a driver's demand based on operation conditions of the driver relative to the vehicle when the engine is started from the idle-stop state; and a clutch controller 5 configured to arbitrarily and selectively select a travel state in which driving power of engine E is transmitted to the driving wheel D by controlling the clutch K corresponding to the driver's demand judged by the judgment controller 6 and a stopped state in which the driving power of engine E is substantially not transmitted to the driving wheel D and the stopped state of vehicle is kept, when starting the engine E from the idle-stop state, it is possible to quickly start the vehicle corresponding to a driver's accelerator operation by selecting the travel state, for example, when the driver's demand is travel (i.e. start), and it is also possible to surely stop the vehicle by selecting the stopped state when the driver's demand is stop. Accordingly, finer control of the vehicle corresponding to the driver's demand can be achieved by judging the driver's demand based on the operation conditions of the driver relative to the vehicle when the engine E is started from the idle-stop state.

In addition, according to some embodiments, since the vehicle further comprises two operation controllers for performing braking operation wherein at least one of which forms a first brake 8 mounted on one tip end of the bar handle H and the other forms a second brake 9, 13 and the engine E is started from the idle-stop state subject when both the first and second brake 8, (9, 13) are changed to a non-operation state, it is possible to more smoothly and surely perform keeping and release of the idle-stop corresponding to the driver's demand.

Especially under the travel state, since steady travel control including a start control or a gear shift control when an accelerator operation is performed and a creep control enabling travel under the idling state of engine E without any accelerator operation are selectively performed corresponding to the driver's demand judged by the judgment controller 6, it is possible to quickly start the vehicle corresponding to the accelerator operation when starting the engine E from the idle-stop state and also to start the vehicle at a low speed when the driver's demand is the creep control and thus to eliminate delicate accelerator operation.

In some embodiments, since the saddle-type vehicle further includes a gear shift controller 4 configured to control a transmission and since under the stopped state, a neutral control for changing the transmission (1, 1') to neutral and an idle-neutral control for keeping the stopped state of vehicle under the idling state are selectively performed corresponding to the driver's demand judged by the judgment controller 6, it is possible to perform further finer control corresponding to the driver's demand.

In some embodiments, since the start control and creep control enable the driving power of engine E to be transmitted to the driving wheel D by controlling the clutch K during the start of engine E, it is possible to more quickly and smoothly perform the start motion and creep motion of vehicle. In some cases, since the saddle-type vehicle further comprises detection sensors (S3-S6) for detecting whether a main stand 12 and a side stand 11 are used, whether the seat 10 is used and whether the grasping grip Gb and the throttle grip Ga are grasped, and since the judgment controller 6 can change the state of vehicle to the stopped state based on at least one detection of the detection sensors (S3-S6), it is possible to keep the stopped state of vehicle by surely judging the driver's demand. Furthermore, according to the some embodiments, since the idle-neutral control is performed when the engine E is started from the idle-stop state without driver's operation, it is possible to surely inhibit or prevent unintentional start of vehicle in the absence of driver demand and therefore traffic safety can be improved.

According to some embodiments, since the saddle-type vehicle comprises the judgment controller 6 which is configured to judge whether simultaneous operation of the first and second brakes 8, 9 (13) has been performed and performs the idle-stop by the engine ECU 2 (engine controller) during deceleration of a vehicle when the judgment controller 6 has judged the simultaneous operation of the first and second brakes 8, 9 (13), it is possible to perform the idle-stop during deceleration corresponding to the demand of a driver.

In some embodiments, since the first brake 8 is an operation controller mounted on a tip end of the bar handle H at a side of the throttle grip Ga, and since it can be judged that the accelerator operation by the throttle grip Ga is not intended when the first brake 8 is operated in addition to operation of the second brake (9, 13), it is possible to judge that the driver's demand is to perform the idle-stop. Accordingly, it is possible to surely perform the idle-stop during deceleration corresponding to the driver's demand.

In some embodiments, since it is judged that the simultaneous operation of the first brake 8 and second brake 9, 13 has been performed when the second brake 9, 13 had been operated and the first brake 8 had been continuously operated for a predetermined period of time, it is possible to judge that the accelerator operation by the throttle grip Ga is not performed and thus the driver's demand is to perform the idle-stop. Accordingly, it is possible to surely perform the idle-stop during deceleration corresponding to the driver's demand.

Furthermore, since the judgment controller 6 can be configured to judge that the speed of a vehicle is lower than the predetermined speed (idle stop reception vehicle speed) and to make the engine ECU 2 (engine controller) perform the idle-stop in addition to the simultaneous operation of the first brake 8 and the second brake 9, 13 subject to a judgment that it is lower than the predetermined speed, it is possible for designers of a vehicle to arbitrarily design a timing of the idle-stop and thus to improve the freedom of design.

In some embodiments, since the saddle-type vehicle comprises the clutch controller 5 configured to enable the creep control for control the clutch so that a vehicle can travel under the idling state of the engine E without accelerator operation and the clutch controller 5 can be configured to perform the creep control subject to judgement by the judgment controller 6 that the first brake 8 and the second brake 9, 13 are not simultaneously operated, it is possible to selectively perform the idle-stop or the creep control corresponding to the driver's demand.

Although the vehicles described herein include saddle-type vehicles, the present disclosure is not limited to the described and illustrated embodiments. For example, the present disclosure is not limited to a saddle-type vehicle which is able to arbitrarily select a travel state travelling with transmitting the driving power of engine E to the driving wheel D and a stopped state in which the driving power of engine E is substantially not transmitted to the driving wheel D by controlling the clutch K or the transmission (1, 1') corresponding to the driver's demand judged by the judgment controller 6 when the engine E is started from the idle-stop state. In addition, the first brake 8 is not limited to the operating controller mounted on the tip end of the bar handle H at the side in which the throttle grip Ga is mounted and thus operating controllers mounted on other positions may be used. Furthermore, the saddle-type vehicle of the present disclosure is not limited to two-wheeled vehicles and thus the present disclosure may be applied to other types of vehicles which are driven by a driver sitting on a seat and steered by a bar handle.

The present invention can be applied to other saddle-type vehicles although having different appearances and other functions than that described in this application, including but not limited to saddle-type vehicles comprising a controller for judging whether a simultaneous operation of the first and second brake has been achieved and making the engine controller perform the idle-stop during deceleration of the vehicle.

What is claimed is:

1. A saddle-type vehicle which can be driven by a driver straddling a seat with steering a bar handle, the vehicle comprising:
    the bar handle having opposite tip ends, the bar handle on one tip end having a grasping grip configured to be grasped by a driver and a throttle grip on the other tip end for accelerator operation;
    two operation means for performing braking operation, at least one of operation means being one of a first brake means and a second brake means and at least one of the first and second brake means being mounted on a tip end of the bar handle; and
    an engine control means for automatically stopping an engine and transitioning the engine to an idle-stop state wherein:
    the saddle-type vehicle further comprises:
        a judgment means for judging whether a respective operation of the first and second brake means has been achieved; and
        a clutch control means for controlling a clutch so that the clutch engages in creep control enabling the vehicle to travel during a state of no-accelerator operation during idling of the engine;
    the engine control means is configured to perform the idle-stop during deceleration of the vehicle when the judgment means judges that a simultaneous operation of the first and second brake means has been performed; and
    the creep control by the clutch control means is performed when the judgment means judges that the second brake means has been operated but the first brake means has not been operated when the accelerator operation of the throttle grip is not performed and the engine is not in the idle-stop state.

2. The saddle-type vehicle of claim 1 wherein the first brake means comprises an operating means mounted on the tip end of the bar handle to which the throttle grip is mounted.

3. The saddle-type vehicle of claim 2 wherein the judgment means is configured to judge that the first brake means has been operated when the first brake means is continuously operated for a predetermined period of time.

4. The saddle-type vehicle of claim 1 wherein the judgment means is configured to judge when the speed of a vehicle is lower than a predetermined speed and to make the engine control means perform the idle-stop when the judgment means determines that the vehicle speed is lower than the predetermined speed and that the first and second brake means are simultaneously operated.

5. The saddle-type vehicle of claim 2 wherein the judgment means is configured to judge when the speed of a vehicle is lower than a predetermined speed and to make the engine control means perform the idle-stop when the judgment means determines that the vehicle speed is lower than the predetermined speed and that the first and second brake means are simultaneously operated.

6. The saddle-type vehicle of claim 3 wherein the judgment means is configured to judge when the speed of a vehicle is lower than a predetermined speed and to make the engine control means perform the idle-stop when the judgment means determines that the vehicle speed is lower than the predetermined speed and that the first and second brake means are simultaneously operated.

7. The saddle-type vehicle of claim 1 wherein the clutch control means is configured to perform the creep control subject to judgment of the judgment means that the vehicle speed is lower than a predetermined speed, accelerator operation by the throttle grip is not made, and a simultaneous operation of the first and second brake means is not performed.

8. The saddle-type vehicle of claim 1 wherein the vehicle further comprises a stepwise variable transmission provided with a dog clutch, and wherein the idle-stop by the engine control means is configured to be performed subject to judgment of the judgment means that a dog clutch of the stepwise variable transmission is in a power transmission state and a simultaneous operation of the first and second brake means is performed.

9. The saddle-type vehicle of claim 4 wherein the vehicle further comprises a stepwise variable transmission provided with a dog clutch, and wherein the idle-stop by the engine control means is configured to be performed subject to judgment of the judgment means that a dog clutch of the stepwise variable transmission is in a power transmission state and a simultaneous operation of the first and second brake means is performed.

10. The saddle-type vehicle of claim 1 wherein the vehicle further comprises a continuously variable transmission, and wherein the idle-stop by the engine control means is configured to be performed subject to judgment of the judgment means that a gear ratio of the continuously variable transmission is a predetermined value or more and a simultaneous operation of the first and second brake means is performed.

11. A saddle-type vehicle which can be driven by a driver straddling a seat with steering a bar handle, the vehicle comprising:
the bar handle having opposite tip ends, the bar handle on one tip end having a grasping grip configured to be grasped by a driver and a throttle grip on the other tip end for accelerator operation;
two operation controllers configured to perform braking operations, wherein at least one of operation controllers is one of a first brake and a second brake and at least one of the first and second brakes is mounted on a tip end of the bar handle; and
an engine controller configured to automatically stop an engine and transition the engine to an idle-stop state wherein:
the saddle-type vehicle further comprises:
a judgment controller configured to judge whether a respective operation of the first and second brakes has been achieved; and
a clutch controller configured to control a clutch such that the clutch engages in creep control to enable the vehicle to travel during a state of no-accelerator operation during idling of the engine;
the engine controller is configured to perform the idle-stop during deceleration of the vehicle when the judgment controller judges that a simultaneous operation of the first and second brakes has been performed; and
the creep control by the clutch controller is configured to be performed when the judgment controller judges that the second brake has been operated but the first brake has not been operated when the accelerator operation of the throttle grip is not performed and the engine is not in the idle-stop state.

12. The saddle-type vehicle of claim 11 wherein the first brake comprises an operating controller mounted on the tip end of the bar handle to which the throttle grip is mounted.

13. The saddle-type vehicle of claim 12 wherein the judgment controller is configured to judge that the first brake has been operated when the first brake is continuously operated for a predetermined period of time.

14. The saddle-type vehicle of claim 11 wherein the judgment controller is configured to judge when the speed of a vehicle is lower than a predetermined speed and to make the engine controller perform the idle-stop when the judgment controller determines that the vehicle speed is lower than the predetermined speed and that the first and second brakes are simultaneously operated.

15. The saddle-type vehicle of claim 12 wherein the judgment controller is configured to judge when the speed of a vehicle is lower than a predetermined speed and to make the engine controller perform the idle-stop when the judgment controller determines that the vehicle speed is lower than the predetermined speed and that the first and second brakes are simultaneously operated.

16. The saddle-type vehicle of claim 13 wherein the judgment controller is configured to judge when the speed of a vehicle is lower than a predetermined speed and to make the engine controller perform the idle-stop when the judgment controller determines that the vehicle speed is lower than the predetermined speed and that the first and second brakes are simultaneously operated.

17. The saddle-type vehicle of claim 11 wherein the creep control by the clutch controller is configured to be performed subject to judgment of the judgment controller that the vehicle speed is lower than a predetermined speed, accelerator operation by the throttle grip is not made, and a simultaneous operation of the first and second brakes is not performed.

18. The saddle-type vehicle of claim 11 wherein the vehicle further comprises a stepwise variable transmission provided with a dog clutch, and wherein the idle-stop by the engine controller is configured to be performed subject to judgment of the judgment controller that a dog clutch of the stepwise variable transmission is in a power transmission state and a simultaneous operation of the first and second brakes is performed.

19. The saddle-type vehicle of claim 14 wherein the vehicle further comprises a stepwise variable transmission provided with a dog clutch, and wherein the idle-stop by the engine controller is configured to be performed subject to judgment of the judgment controller that a dog clutch of the stepwise variable transmission is in a power transmission state and a simultaneous operation of the first and second brakes is performed.

20. The saddle-type vehicle of claim 11 wherein the vehicle further comprises a continuously variable transmission, and wherein the idle-stop by the engine controller is configured to be performed subject to judgment of the judgment controller that a gear ratio of the continuously variable transmission is a predetermined value or more and a simultaneous operation of the first and second brakes is performed.

* * * * *